US012783135B1

(12) United States Patent
Bhushan et al.

(10) Patent No.: US 12,783,135 B1
(45) Date of Patent: Nov. 3, 2026

(54) DIRECT MEMORY ACCESS OPERATIONS

(71) Applicant: QUALCOMM Incorporated, San Diego, CA (US)

(72) Inventors: Vishal Bhushan, Patiala (IN); Ranjith Srinivas A B, Kolar (IN); Vasantha Kumar Bandur Puttappa, Bangalore (IN)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 19/221,291

(22) Filed: May 28, 2025

(51) Int. Cl.
*G06F 3/06* (2006.01)

(52) U.S. Cl.
CPC .......... *G06F 3/0625* (2013.01); *G06F 3/0631* (2013.01); *G06F 3/0673* (2013.01)

(58) Field of Classification Search
CPC ..... G06F 3/0625; G06F 3/0631; G06F 3/0673
USPC .......... 711/154, 100
See application file for complete search history.

(56) References Cited

U.S. PATENT DOCUMENTS 9,465,749 B2 * 10/2016 Moll .................. G06F 12/0207
2006/0031524 A1 * 2/2006 Freimuth .............. H04L 69/161 709/227
2016/0034719 A1 * 2/2016 Choi ................ G11B 20/00086 713/193

* cited by examiner

*Primary Examiner* — Hosain T Alam
*Assistant Examiner* — Zubair Ahmed
(74) *Attorney, Agent, or Firm* — HARRITY & HARRITY, LLP

(57) ABSTRACT

In some aspects, a system memory management unit may receive, from a client device, a request associated with a memory device operation. The system memory management unit may allocate, based at least in part on the request from the client device, one or more unused hardware resources of the system memory management unit for a direct memory access operation. In some aspects, the memory subsystem may receive, from the system memory management unit, a buffer discovery request associated with allocating one or more unused hardware resources of the system memory management unit for a direct memory access operation. The memory subsystem may send, to the system memory management unit, a response that indicates an availability of one or more buffers of the memory subsystem.

20 Claims, 18 Drawing Sheets

900

DIRECT MEMORY ACCESS OPERATIONS

FIELD OF THE DISCLOSURE

Aspects of the present disclosure generally relate to integrated circuits, memory devices, and, for example, to direct memory access operations.

DESCRIPTION OF RELATED TECHNOLOGY

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

Flash memory is a non-volatile data storage medium in which data may be electrically written and erased. Flash memory is currently used in a variety of flash memory based storage devices, such as memory cards, solid state drives, or universal serial bus (USB) drives, among other examples. Flash memory based storage devices may provide faster read and write times comparable to DRAM while providing higher durability and impact resistance than conventional hard disks.

To facilitate the use of flash memory based storage devices, standards are being developed or are currently under development. One example standard is universal flash storage (UFS) developed by the Joint Electronic Devices Engineering Council (JEDEC) for flash memory based storage. UFS employs command protocols and a small computer system interface (SCSI) architecture model that supports multiple commands with command queue features, thereby enabling a multi-threaded programming paradigm. Another standard developed by JEDEC is the Embedded Multimedia Card (eMMC) standard, which provides a simplified application interface design, small package size, or low power consumption, among other examples.

SUMMARY

In some aspects, a method performed by a system memory management unit includes receiving, from a client device, a request associated with a memory device operation; allocating, based at least in part on the request from the client device, one or more unused hardware resources of the system memory management unit for a direct memory access operation; and communicating with a memory subsystem using the allocated hardware resources of the system memory management unit to perform the direct memory access operation.

In some aspects, a method performed by a memory subsystem includes receiving, from a system memory management unit, a buffer discovery request associated with allocating one or more unused hardware resources of the system memory management unit for a direct memory access operation; and sending, to the system memory management unit, a response that indicates an availability of one or more buffers of the memory subsystem.

In some aspects, a system memory management unit includes one or more memories; and one or more processors, coupled to the one or more memories, configured to: receive, from a client device, a request associated with a memory device operation; allocate, based at least in part on the request from the client device, one or more unused hardware resources of the system memory management unit for a direct memory access operation; and communicate with a memory subsystem using the allocated hardware resources of the system memory management unit to perform the direct memory access operation.

In some aspects, a memory subsystem includes one or more memories; and one or more processors, coupled to the one or more memories, configured to: receive, from a system memory management unit, a buffer discovery request associated with allocating one or more unused hardware resources of the system memory management unit for a direct memory access operation; and send, to the system memory management unit, a response that indicates an availability of one or more buffers of the memory subsystem.

In some aspects, a non-transitory computer-readable medium storing a set of instructions includes one or more instructions that, when executed by one or more processors of a system memory management unit, cause the system memory management unit to: receive, from a client device, a request associated with a memory device operation; allocate, based at least in part on the request from the client device, one or more unused hardware resources of the system memory management unit for a direct memory access operation; and communicate with a memory subsystem using the allocated hardware resources of the system memory management unit to perform the direct memory access operation.

In some aspects, a non-transitory computer-readable medium storing a set of instructions includes one or more instructions that, when executed by one or more processors of a memory subsystem, cause the memory subsystem to: receive, from a system memory management unit, a buffer discovery request associated with allocating one or more unused hardware resources of the system memory management unit for a direct memory access operation; and send, to the system memory management unit, a response that indicates an availability of one or more buffers of the memory subsystem.

In some aspects, an apparatus includes means for receiving, from a client device, a request associated with a memory device operation; means for allocating, based at least in part on the request from the client device, one or more unused hardware resources of the apparatus for a direct memory access operation; and means for communicating with a memory subsystem using the allocated hardware resources of the apparatus to perform the direct memory access operation.

In some aspects, an apparatus includes means for receiving, from a system memory management unit, a buffer discovery request associated with allocating one or more unused hardware resources of the system memory management unit for a direct memory access operation; and means for sending, to the system memory management unit, a response that indicates an availability of one or more buffers of the apparatus.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
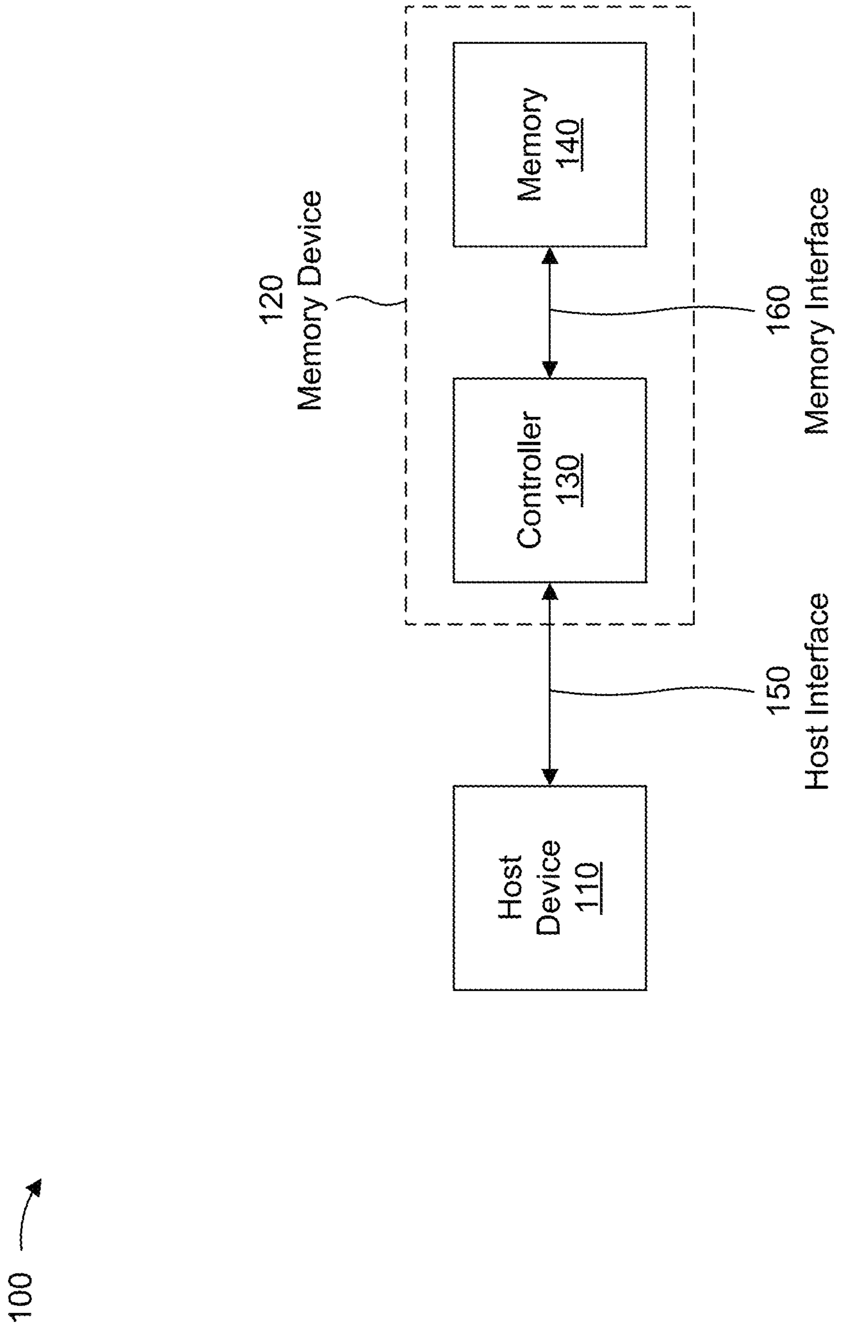
FIG. 1 is a diagram illustrating an example system that may support direct memory access operations.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Direct memory access (DMA) is a process that allows one or more components in a system-on-chip (SoC) to transfer data directly to or from a memory without involving a central processing unit (CPU), thereby improving an efficiency of memory device operations in the memory system. An SoC is a single integrated circuit that combines multiple components such as a CPU, a graphics processing unit (GPU), and an input/output (I/O) interface into one chip, thereby enhancing performance and reducing power consumption of the SoC client device. SoC devices may use DMA operations to facilitate access to data stored in the memory, particularly as the demand for hardware accelerators increases. Hardware accelerators, which may serve various applications such as image processing or data compression, may rely on DMA engines to offload copy-and-move operations from the CPU. However, as the number of hardware accelerators within the SoC grows, the resulting demand for DMAs may lead to a significant increase in memory device resource consumption.

A system memory management unit (SMMU) is a subsystem within the SoC that performs virtual-to-physical-address translations. The SMMU may include components such as a translation buffer and a translation cache. The translation cache may include one or more hardware resources that perform address translation, such as virtual address to physical address translation converters. These hardware resources that perform address translation may be referred to herein as “walkers.” Although the SMMU may support a substantial number of walkers, walkers are often underutilized in SoC client devices, leading to inefficient use of the hardware resources dedicated to the SMMU. While the requirements for DMA engines within the SoC are increasing, it may be desirable to reduce hardware resource usage without sacrificing the performance or functionality required by various DMA-dependent components within the SoC. Additionally, the conventional use of dedicated system buffers within a memory subsystem of the SoC client device for storing DMA data may result in a static allocation of resources that may not be optimized for varying workload demands. This static approach can lead to suboptimal usage of the memory subsystem buffers, which are valuable resources within the SoC.

Various aspects relate generally to memory device operations. Some aspects relate more specifically to direct memory access operations. In some aspects, an SMMU may receive a request associated with a memory device operation. In some aspects, the request associated with the memory device operation may be, or may include, a resource inspection request. The SMMU, based at least in part on receiving the request associated with the memory device operation, may allocate one or more unused hardware resources of the SMMU for a direct memory access operation. In some aspects, the one or more unused hardware resources may be associated with a translation controller of the SMMU. In some aspects, the one or more unused hardware resources may be, or may include, one or more walkers. In some aspects, the memory subsystem may receive, from the SMMU, a buffer discovery request associated with allocating the one or more unused hardware resources of the SMMU for direct memory access. The memory subsystem may send, to the SMMU, a response that indicates an availability of one or more underutilized buffers of the memory subsystem. The SMMU may allocate the one or more unused hardware resources (e.g., the one or more walkers) based at least in part on a quantity of available buffers satisfying a buffer availability threshold. The SMMU may communicate with a memory subsystem using the allocated hardware resources of the SMMU to perform the direct memory access operation. For example, the SMMU may communicate with the memory subsystem to perform a write operation, a copy operation, or a read operation using the one or more walkers.

Particular aspects of the subject matter described in this disclosure can be implemented to realize one or more of the following potential advantages. In some examples, by enabling the unused hardware resources (e.g., walkers) to be used for direct memory access operations, the described techniques can be used to enable resource savings, for example, by reducing the need for additional dedicated direct memory access hardware. This efficient use of existing hardware within the SoC may conserve processing resources and memory resources, and may reduce overall power consumption, thereby contributing to a more energy efficient SoC design. In some examples, by enabling the unused hardware resources (e.g., walkers) to be used for direct memory access operations, the described techniques can be used to reduce buffer contention and increase efficiency in direct memory access operations, thereby conserving memory bandwidth and improving throughput of a double data rate (DDR) subsystem. In some examples, by enabling the unused hardware resources (e.g., walkers) to be used for direct memory access operations, the described techniques can be used to enable enhanced data management capabilities, such as scatter-gather operations, without the need for additional hardware. In some examples, by enabling the unused hardware resources (e.g., walkers) to be used for direct memory access operations, the described techniques can be used to increase a likelihood that direct memory access tasks are completed without unnecessary delays, thereby conserving processing resources and improving the system's overall performance. In some examples, by enabling the unused hardware resources (e.g., walkers) to be used for direct memory access operations, the described techniques can be used to optimize the use of buffers within the DDR subsystem, reduce operational complexity, and enhance the performance of direct memory access operations. These example advantages, among others, are described in more detail herein.

FIG. 1 is a diagram illustrating an example system 100 that may support direct memory access operations. The system 100 may include one or more devices, apparatuses, or components for performing operations described herein. The system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160. In some examples, the system 100 may be referred to as a SoC client device and the memory device 120 may be referred to as a memory sub-system.

The system 100 may be any suitable electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), or an Internet of Things (IoT) device, among other examples. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), or the like.

The memory device 120 may be any electronic device configured to store data in memory. In some aspects, the memory device 120 may be an electronic device configured to store data temporarily in volatile memory. For example, the memory device 120 may be a random-access memory (RAM) device, such as a dynamic RAM (DRAM) device or a static RAM (SRAM) device. In this case, the memory 140 may include volatile memory that requires power to maintain stored data and that loses stored data after the memory device 120 is powered off. For example, the memory 140 may include one or more latches or RAM, such as DRAM or SRAM. In some aspects, the memory 140 may include non-volatile memory configured to maintain stored data after the memory device 120 is powered off, such as NAND memory or NOR memory. For example, the non-volatile memory may store persistent firmware or other instructions for execution by the controller 130.

The controller 130 may be any device configured to communicate with the host device 110 (e.g., via the host interface 150) and the memory 140 (e.g., via the memory interface 160). Additionally, or alternatively, the controller 130 may be configured to control operations of the memory device 120 or the memory 140. For example, the controller 130 may include control logic, a memory controller, a system controller, an ASIC, an FPGA, a processor, a microcontroller, or one or more processing components. In some aspects, the controller 130 may be a high-level controller, which may communicate directly with the host device 110 and may instruct one or more low-level controllers regarding memory operations to be performed in connection with the memory 140. In some examples, the controller 130 may be a low-level controller, which may receive instructions regarding memory operations from a high-level controller that interfaces directly with the host device 110. As an example, a high-level controller may be a solid state drive (SSD) controller, and a low-level controller may be a non-volatile memory controller (e.g., a NAND controller) or a volatile memory controller (e.g., a DRAM controller). In some aspects, a set of operations described herein as being performed by the controller 130 may be performed by a single controller (e.g., the entire set of operations may be performed by a single high-level or low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a small computer system interface (SCSI), a serial-attached SCSI (SAS), a serial advanced technology attachment (SATA) interface, a peripheral component interconnect express (PCIe) interface, a non-volatile memory express (NVMe) interface, a universal serial bus (USB) interface, a UFS interface, or an embedded multimedia card (eMMC) interface, among other examples.

The memory interface 160 enables communication between the controller 130 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some aspects, as described in more detail elsewhere herein, one or more systems, devices, apparatuses, components, or controllers of FIG. 1 may be configured to receive a request associated with a memory device operation. Additionally, or alternatively, one or more systems, devices, apparatuses, components, or controllers of FIG. 1 may be configured to allocate one or more unused hardware resources of the system memory management unit for a direct memory access operation. Additionally, or alternatively, one or more systems, devices, apparatuses, components, or controllers of FIG. 1 may be configured to communicate using the allocated hardware resources of the system memory management unit to perform the direct memory access operation. In some aspects, as described in more detail elsewhere herein, one or more systems, devices, apparatuses, components, or controllers of FIG. 1 may be configured to receive a buffer discovery request associated with allocating one or more unused hardware resources for a direct memory access operation. Additionally, or alternatively, one or more systems, devices, apparatuses, components, or controllers of FIG. 1 may be configured to send a response that indicates an availability of one or more buffers. Additionally, or alternatively, one or more systems, devices, apparatuses, components, or controllers of FIG. 1 may be configured to perform one or more other operations described herein.

As indicated above, FIG. 1 is provided as an example. Other examples may differ from what is described with regard to FIG. 1. For example, some aspects described herein are broadly applicable to other circuits, including circuits that are fully contained on-die (e.g., within a system-on-chip (SoC)) or circuits associated with non-memory external interfaces (e.g., a serializer/deserializer (SerDes)).

Figure 2:
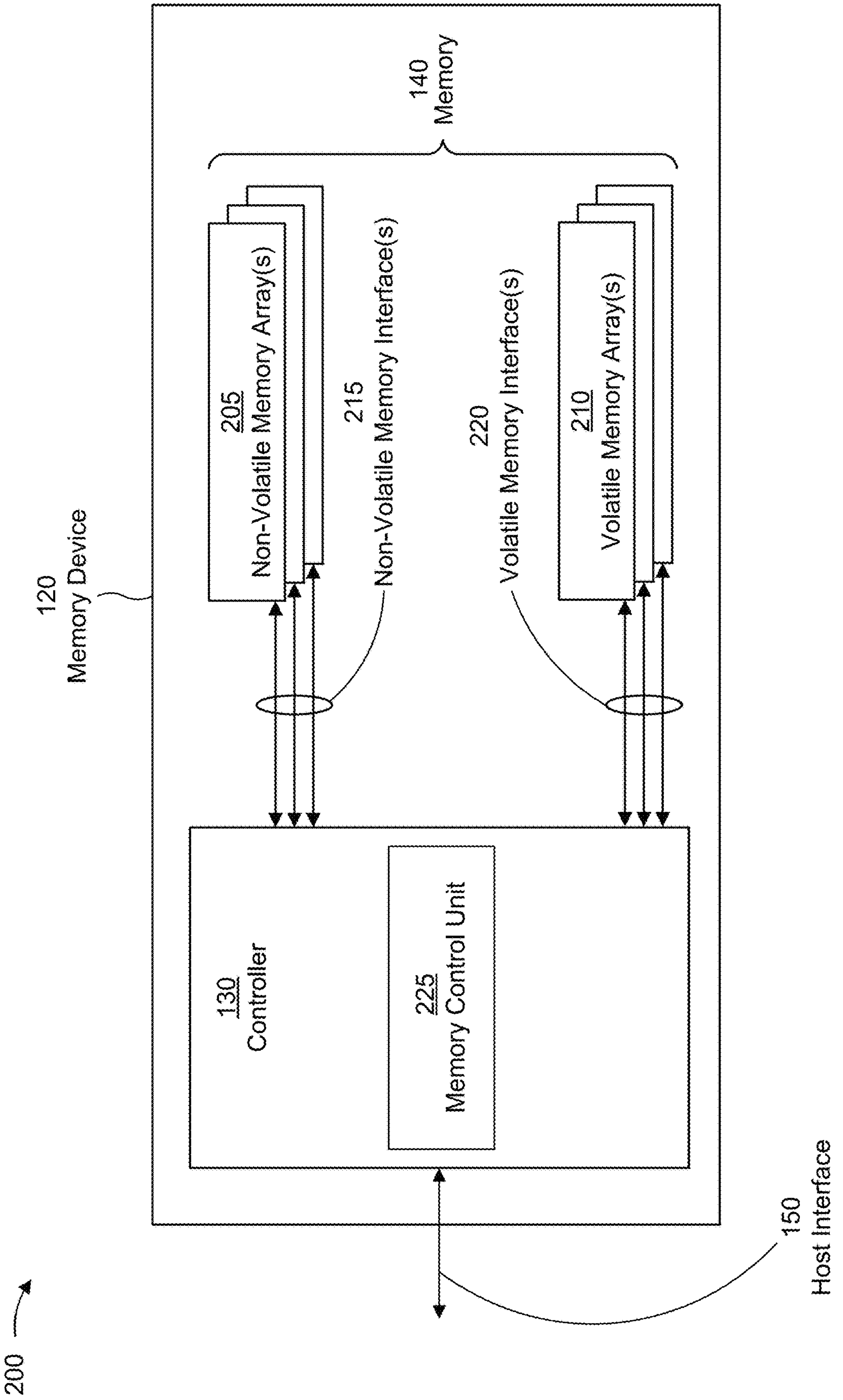
FIG. 2 is a diagram illustrating an example of components included in a memory device that may support direct memory access operations.

FIG. 2 is a diagram illustrating an example 200 of components included in a memory device 120 that may support direct memory access operations. As described above in connection with FIG. 1, the memory device 120 may include a controller 130 and memory 140. As shown in FIG. 2, the memory 140 may include one or more non-volatile memory arrays 205, such as one or more NAND memory arrays or one or more NOR memory arrays. Additionally, or alternatively, the memory 140 may include one or more volatile memory arrays 210, such as one or more SRAM arrays or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute the one or more instructions stored in the memory 140. Additionally, or alternatively, the controller 130 may receive one or more instructions from the host device 110 via the host interface 150, and may execute those one or more instructions. In some aspects, a non-transitory computer-readable medium (e.g., volatile memory or non-volatile memory) may store a set of instructions (e.g., one or more instructions or code) for execution by the controller 130. The controller 130 may execute the set of instructions to perform one or more operations or methods described herein. In some aspects, execution of the set of instructions, by the controller 130, causes the controller 130 or the memory device 120 to perform one or more operations or methods described herein. In some aspects, hardwired circuitry is used instead of or in combination with the one or more instructions to perform one or more operations or methods described herein. Additionally, or alternatively, the controller 130 or one or more components of the memory device 120 may be configured to perform one or more operations or methods described herein. An instruction is sometimes called a "command."

For example, the controller 130 may transmit signals to or receive signals from the memory 140 based on the one or more instructions, such as to transfer data to (e.g., write or program), to transfer data from (e.g., read), or to erase all or a portion of the memory 140 (e.g., one or more memory cells, pages, sub-blocks, blocks, or planes of the memory 140). In some aspects, the controller 130 may translate a host interface command (e.g., a command received from the host device 110) into a memory interface command (e.g., a command for performing an operation on a memory array).

As shown in FIG. 2, the controller 130 may include a memory control unit 225, among other examples. In some aspects, one or more of these components are implemented as one or more instructions (e.g., firmware) executed by the controller 130. Alternatively, one or more of these components may be implemented as dedicated integrated circuits distinct from the controller 130.

The memory control unit 225 may be configured to manage performance of the memory device 120. For example, the memory control unit 225 may perform one or more background operations, such as refreshing, garbage collection, wear leveling, bad block management, block retirement, read disturb management, or other memory management operations. In some aspects, the memory device 120 may store (e.g., in memory 140) one or more memory management tables. A memory management table may store information that may be used by or updated by the memory control unit 225, such as information regarding memory block age, memory block erase count, or error information associated with a memory partition (e.g., a memory cell, a row of memory, a block of memory, or the like).

One or more devices or components shown in FIG. 2 may be configured to perform operations described herein, such as one or more operations or methods described in connection with FIGS. 3-13. For example, the controller 130 or the memory control unit 225, may be configured to perform one or more operations or methods for the memory device 120 as described herein.

In some aspects, the system 100 may include means for receiving a request associated with a memory device operation; means for allocating one or more unused hardware resources for a direct memory access operation; or means for communicating using the allocated hardware resources to perform the direct memory access operation. In some aspects, the means for the system 100 to perform processes or operations described herein may include one or more components described herein, such as the host device 110, a host controller, the host interface 150, the memory device 120, the controller 130, or the memory control unit 225, among other examples.

In some aspects, the system 100 may include means for receiving a buffer discovery request associated with allocating one or more unused hardware resources for a direct memory access operation; or means for sending a response that indicates an availability of one or more buffers. In some aspects, the means for the system 100 to perform processes or operations described herein may include one or more components described herein, such as the host device 110, a host controller, the host interface 150, the memory device 120, the controller 130, or the memory control unit 225, among other examples.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
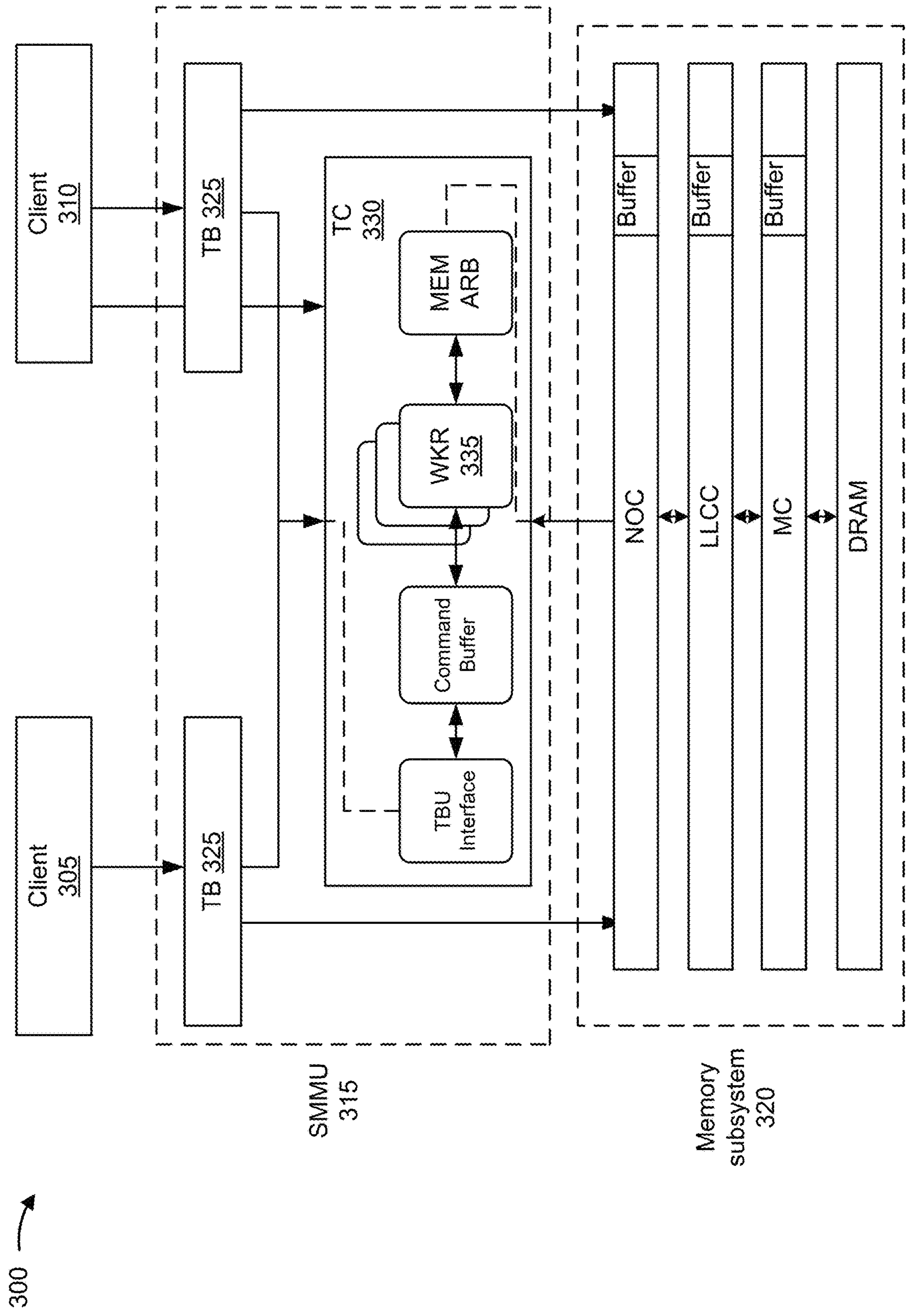
FIG. 3 is a diagram illustrating an example memory system.

FIG. 3 is a diagram illustrating an example memory system 300. One or more client devices, such as the client device 305 or the client device 310, may communicate with the memory system 300. In some aspects, the client device 305 or the client device 310 may include some or all of the features of the host device 110. The memory system 300 may include an SMMU 315 and a memory subsystem 320. The SMMU 315 may include one or more translation buffers (TB) 325. The TB 325 may communicate with one or more of the client device 305 or the client device 310. Additionally, the SMMU 315 may include a translation controller (TC) 330 (shown as TC 330). The TC 330 may include a TBU interface, a command buffer, a walker (WKR) (such as WKR 335), and a memory arbiter (shown as MEM ARB). The memory subsystem 320 may include a network-on-chip (NOC), a last-level cache controller (LLCC), a memory controller (MC), and a dynamic random access memory (DRAM). At least one of the NOC, the LLCC, or the MC may include a buffer. In some aspects, the SMMU 315 may convert a virtual address (VA) into a physical address (PA). The TB 325 may be a first level translation layer buffer (TLB) cache and the TC 330 may be a second level TLB cache. The walker may perform page walks and address translation. For example, for any page missing in the translation cache, the walker may perform a page walk to fetch one or more translation descriptors. The memory subsystem 320 may store table entries for address translation (e.g., in the DRAM). A request from the walker may be sent to the memory subsystem 320 to perform page walks.

As indicated above, FIG. 3 is provided as an example. Other examples may differ from what is described with regard to FIG. 3.

Figure 4A:
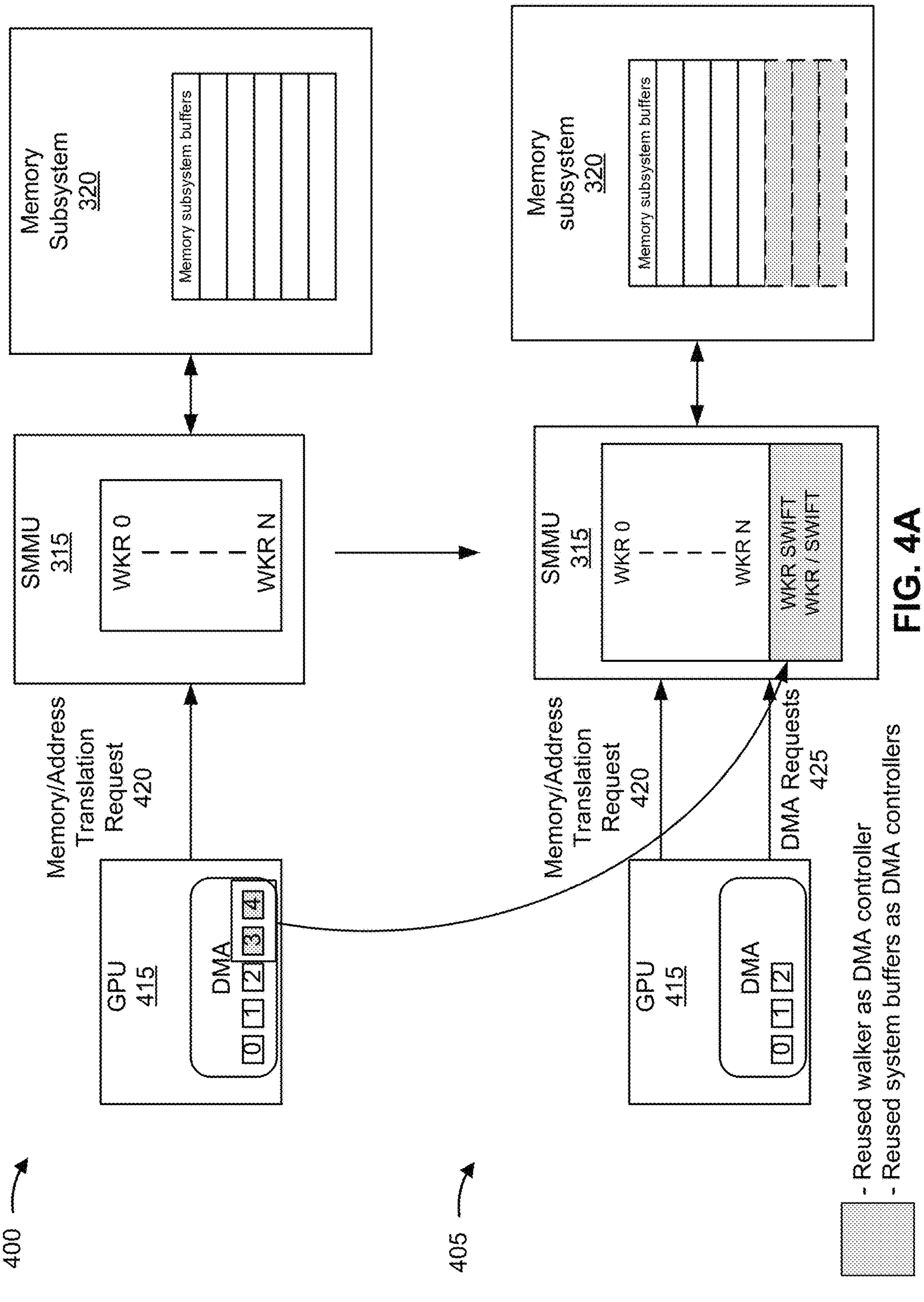
FIGS. 4A-4B are diagrams illustrating examples of system memory management unit walker-integrated fast transfer (SWIFT).
Figure 4B:
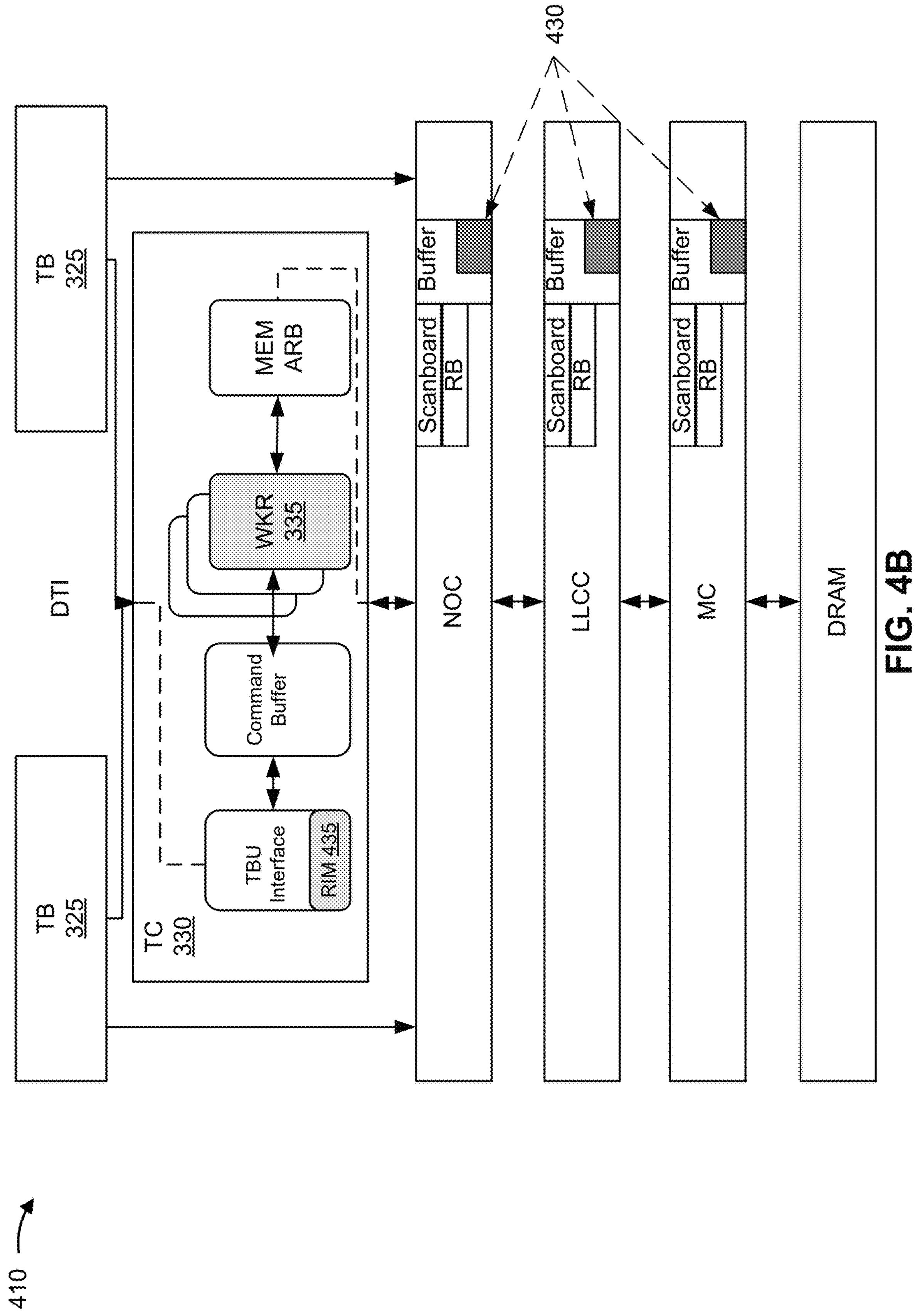

FIGS. 4A-4B are diagrams illustrating examples 400, 405, and 410 of system memory management unit walker-integrated fast transfer (SWIFT). In some aspects, one or more unused hardware resources (e.g., walkers) may be utilized (e.g., repurposed) as a DMA engine for performing DMA operations. Non-critical tasks, such as page compression, may be offloaded to the walkers. System buffers in the memory subsystem 320 may be repurposed as DMA buffers, thereby reducing the need for dedicated buffers. A SWIFT component may include one or more repurposed hardware components that are used for page translation or page walks. A SWIFT operation may include a handshake phase and an execution phase. The handshake phase may include an inspection phase and an allocation phase. Additional details regarding these features are described, for example, with respect to FIGS. 5A, 5B, 6A, 6B, 7A, and 7B. A GPU 415 may communicate with the SMMU 315 and the memory subsystem 320. As shown in example 400 of FIG. 4A, the GPU 415 may include five DMA engines (labeled as 0, 1, 2, 3, and 4). Any of the DMA engines 0-4 may be used for performing a memory or address translation request 420. As shown in example 405 of FIG. 4A, DMA engines 3 and 4 may be used for performing a DMA request 425.

As shown in example 410 of FIG. 4B, one or more buffers 430 may be used to transfer read data to a client device or to copy or write data to the DRAM. The buffers 430 may be reusable buffers that are configured to store DMA data for SWIFT operations. Data storage may be prioritized at a buffer that is closest to the DRAM. In some aspects, a resource inspection and management (RIM) component 435 (shown as RIM 435) may check for the available buffers per-module in the memory subsystem network and may inspect a walker queue to identify one or more available walkers for reuse. The RIM component 435 may determine if an available buffer is beyond a threshold identified by one or more SWIFT operations. Additionally, the RIM component 435 may retrieve and maintain information associated with an incoming SWIFT request and one or more currently active SWIFT requests.

As indicated above, FIGS. 4A-4B are provided as examples. Other examples may differ from what is described with regard to FIGS. 4A-4B.

Figure 5A:
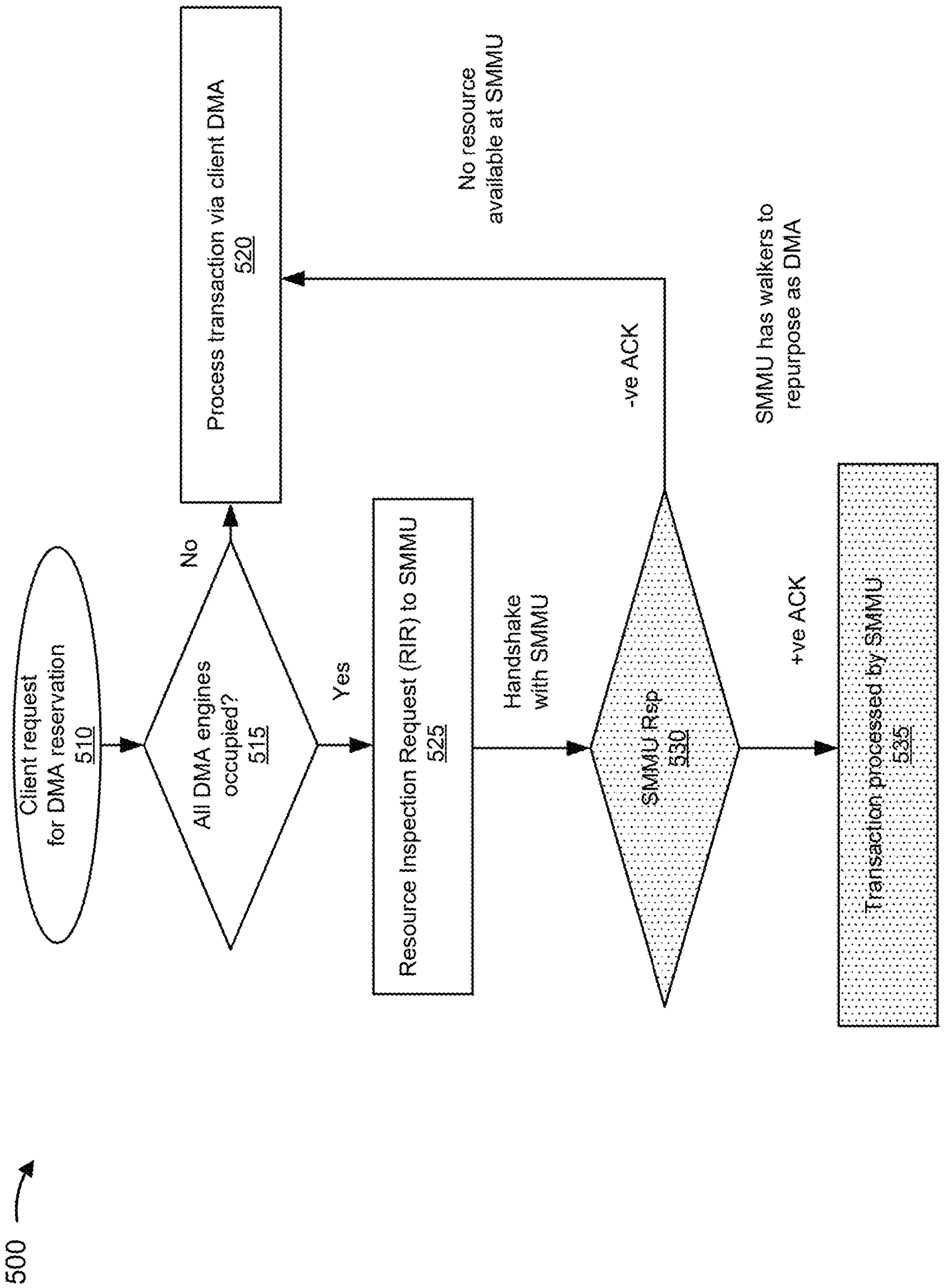
FIGS. 5A-5B are diagrams illustrating examples of SWIFT operations between a client device and a system memory management unit.
Figure 5B:
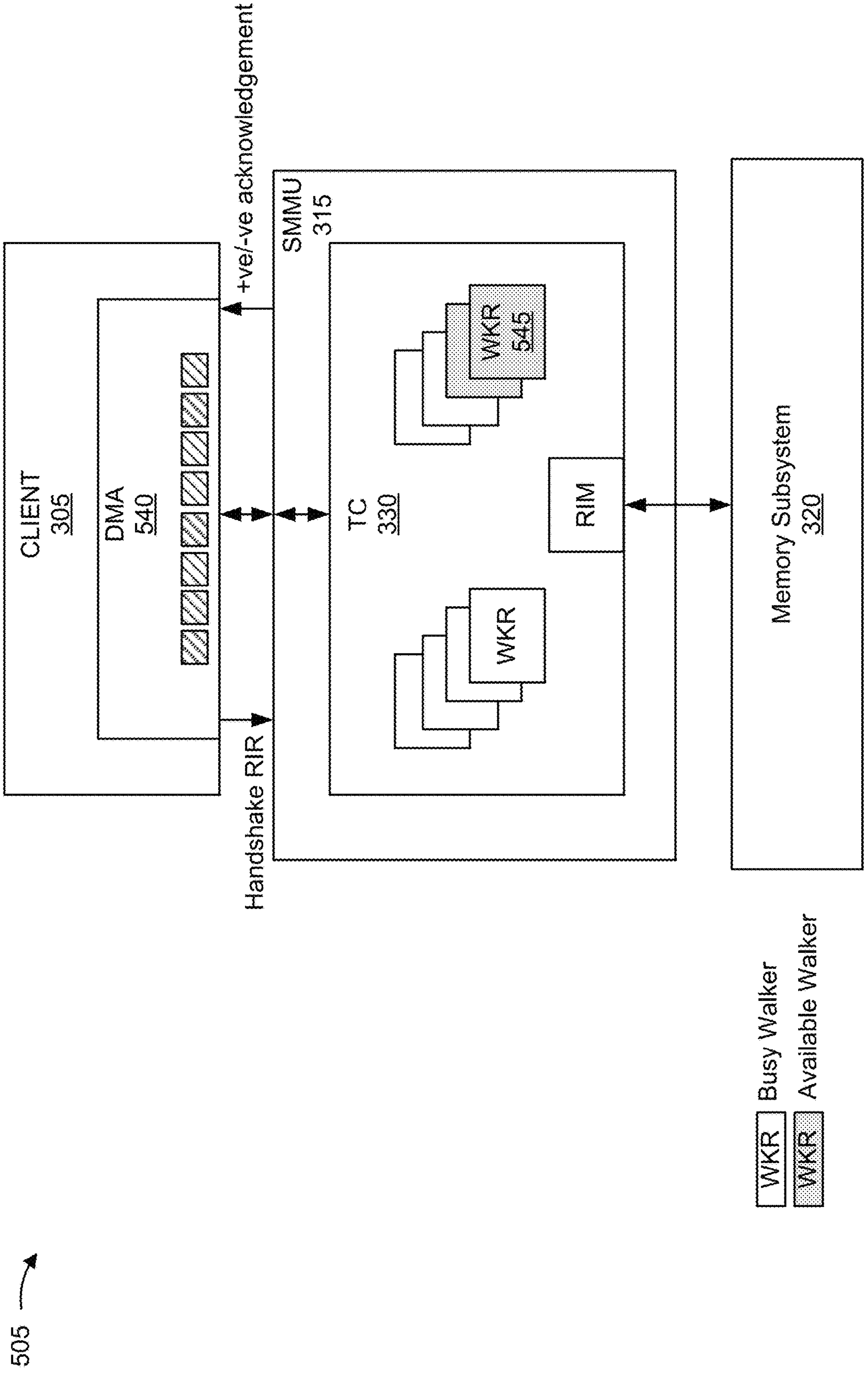

FIGS. 5A-5B are diagrams illustrating examples 500 and 505 of SWIFT operations between a client device and a system memory management unit. In this example, operations performed by the client device are shown with white shading and operations performed by the system memory management unit are shown with dotted shading.

As shown in example 500 of FIG. 5A, and as shown by reference number 510, a client device (such as the client device 305) may send a request for DMA reservation. As shown by reference number 515, the client device may determine whether all DMA engines are occupied (e.g., in use). As shown by reference number 520, if all DMA engines are not occupied (e.g., there are one or more available DMA engines), the client device 305 may process the transaction using the client DMA engine. As shown by reference number 525, if all DMA engines are occupied (e.g., there are no available DMA engines), the client device 305 may send a resource inspection request to the SMMU 315. As shown by reference number 530, based at least in part on the client device 305 and the SMMU 315 performing a handshake operation, the SMMU 315 may generate a TC response. Based at least in part on the SMMU 315 determining that there are no resources available at the SMMU 315, the SMMU 315 may direct the client device 305 to process the transaction at the DMA (as described in connection with reference number 520). Alternatively, as shown by reference number 535, based at least in part on the SMMU 315 determining that the SMMU 315 has walkers to repurpose as DMA engines, the SMMU 315 may process the transaction.

As shown in example 505 of FIG. 5B, a DMA engine (shown as DMA 540) may perform a handshake resource inspection request with the SMMU 315. The SMMU 315 (e.g., the TC 330 of the SMMU 315) may include a WKR 545. One or more available walkers (shown in light gray shading) may be repurposed for DMA operations, as described with respect to example 500 above and as described elsewhere herein.

As indicated above, FIGS. 5A-5B are provided as examples. Other examples may differ from what is described with regard to FIGS. 5A-5B.

Figure 6A:
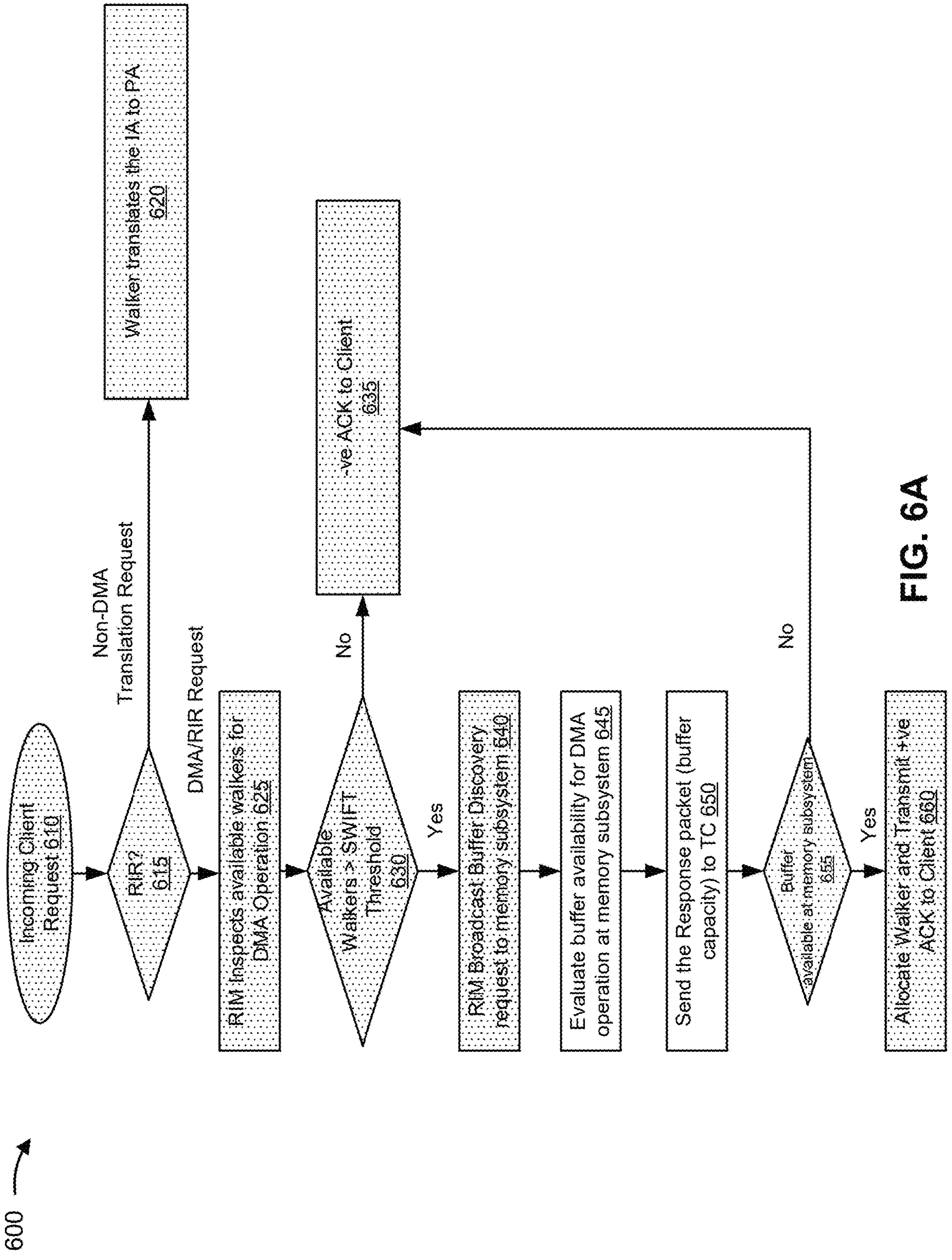
FIGS. 6A-6B are diagrams illustrating examples of SWIFT handshake operations between a system memory management unit and a memory subsystem.
Figure 6B:
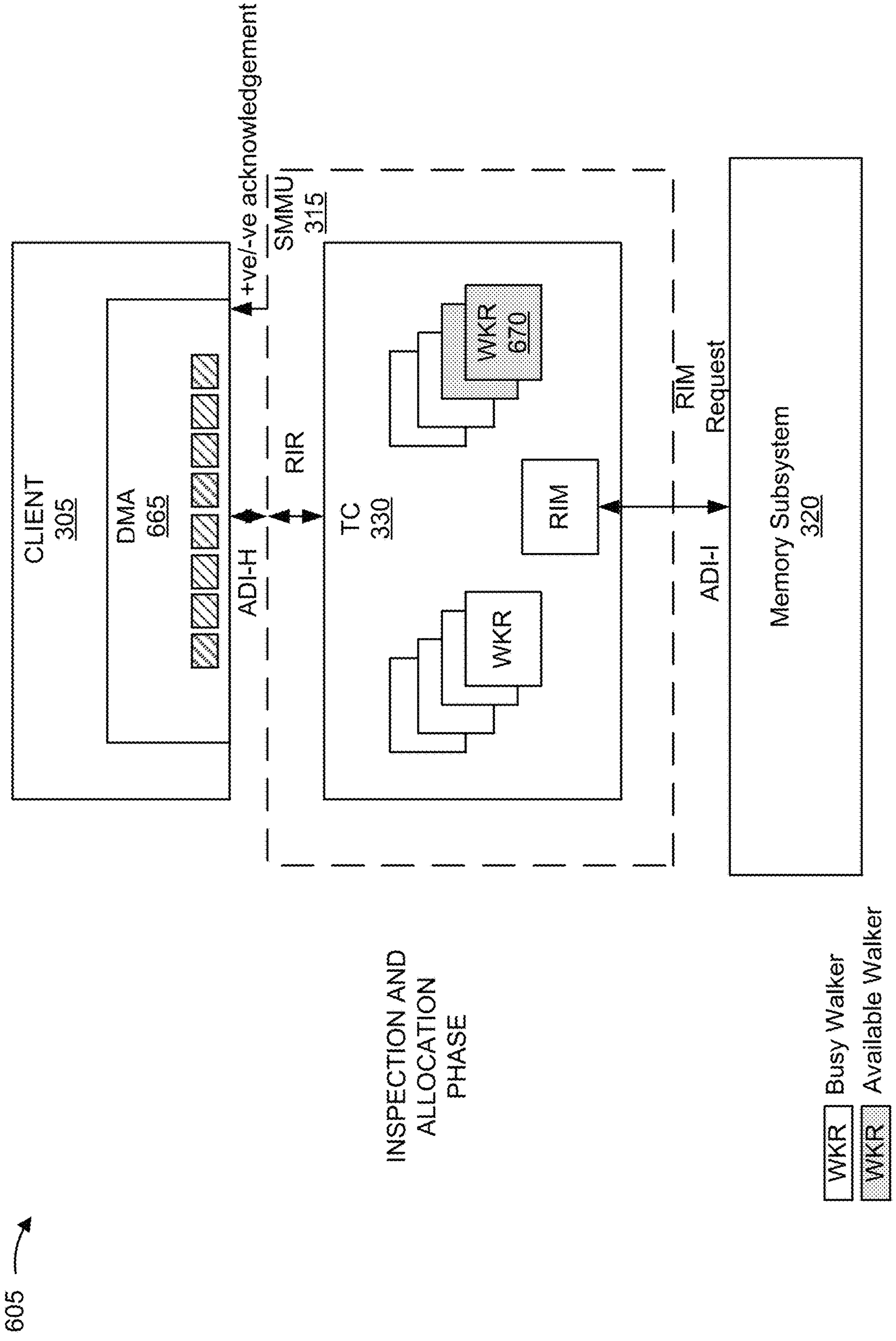

FIGS. 6A-6B are diagrams illustrating examples 600 and 605 of SWIFT handshake operations between a system memory management unit and a memory subsystem. In this example, operations performed by the memory subsystem are shown with white shading and operations performed by the system memory management unit are shown with dotted shading.

As shown by reference number 610, the SMMU 315 may receive an incoming client request. As shown by reference number 615, the SMMU 315 may determine whether the incoming client request is a resource inspection request (RIR). As shown by reference number 620, based at least in part on determining that the incoming request is a non-DMA request, the SMMU 315 may use a walker to translate an inspection address (IA) to a physical address (PA). As shown by reference number 625, based at least in part on determining that the incoming request is a DMA resource inspection request, the SMMU 315 may inspect available walkers for DMA operations. As shown by reference number 630, the SMMU 315 may determine whether a quantity of available walkers is greater than (or greater than or equal to) a SWIFT threshold. As shown by reference number 635, based at least in part on the quantity of available walkers not being greater than (or greater than or equal to) the SWIFT threshold, the SMMU 315 may send a negative acknowledgement (shown as −ve ACK) to the client device 305. As shown by reference number 640, based at least in part on the quantity of available walkers being greater than (or greater than or equal to) the SWIFT threshold, the SMMU 315 may send a RIM buffer discovery request to the memory subsystem 320. As shown by reference number 645, the memory subsystem 320 may evaluate a buffer availability for DMA operations at the memory subsystem 320. As shown by reference number 650, the memory subsystem 320 may send a response packet (e.g., indicating the buffer availability) to the SMMU 315 (e.g., to the TC 330). As shown by reference number 655, the SMMU 315 (e.g., the TC 330) may determine whether the buffers are available at the memory subsystem 320. Based at least in part on buffers not being available at the memory subsystem 320, the SMMU 315 may send a negative acknowledgement (shown as −ve ACK) to the client device 305. As shown by reference number 660, based at least in part on the buffers being available at the memory subsystem 320, the SMMU 315 may allocate the walkers for DMA and may transmit a positive acknowledgement (shown as +ve ACK) to the client device 305. +ve ACK to client device is treated as a confirmation from SMMU that the DMA operations are now handled by SMMU.

As shown in example 605 of FIG. 6B, an inspection phase may include a DMA engine (shown as DMA 665) of the client device 305 sending an RIR to the SMMU 315 of the SMMU 315. The RIR may be communicated over an accelerated DMA interface (ADI) for handshake operations (shown as ADI-H). A RIM component of the SMMU 315 sending a RIM request to the memory subsystem 320. The RIM request may be communicated over an ADI for inspection (shown as ADI-I). The SMMU 315 (e.g., the TC 330 of the SMMU 315) may include a WKR 670. During the allocation phase, one or more available walkers (shown in light gray shading) may be repurposed for DMA operations, as described in example 600 above and as described elsewhere herein.

As indicated above, FIGS. 6A-6B are provided as examples. Other examples may differ from what is described with regard to FIGS. 6A-6B.

Figure 7A:
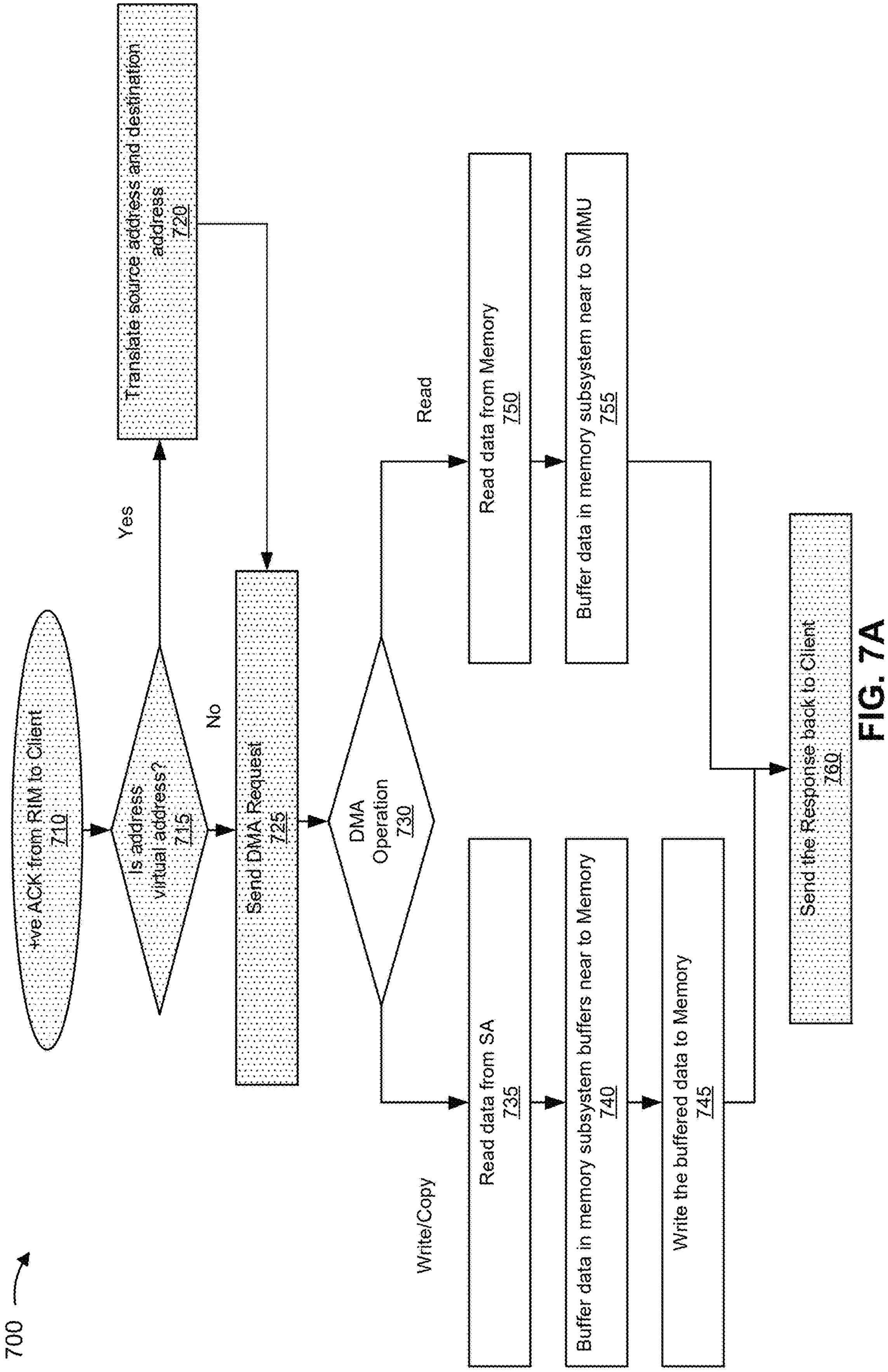
FIGS. 7A-7B are diagrams illustrating examples of SWIFT execution operations between a system memory management unit and a memory subsystem.
Figure 7B:
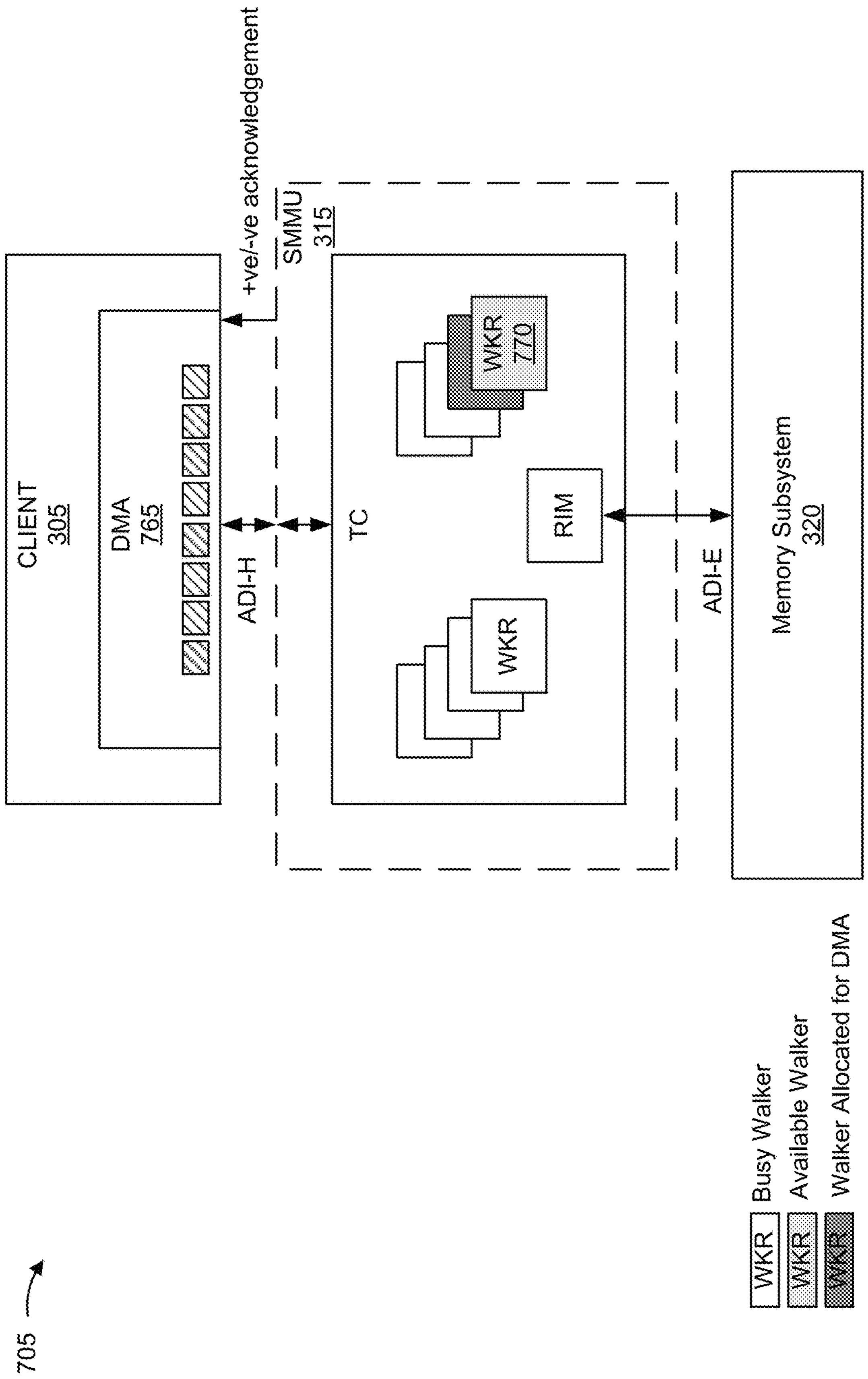

FIGS. 7A-7B are diagrams illustrating examples 700 and 705 of SWIFT execution operations between a system memory management unit and a memory subsystem. In this example, operations performed by the memory subsystem are shown with white shading and operations performed by the system memory management unit are shown with dotted shading.

As shown by reference number 710, the SMMU 315 may send a positive ACK (shown as +ve ACK) to the client device 305. As shown by reference number 715, the SMMU 315 may determine whether an address is a virtual address. As shown by reference number 720, based at least in part on determining that the address is a virtual address, the SMMU 315 may translate a source address and a destination address. As shown by reference number 725, based at least in part on determining that the address is not a virtual address, the SMMU 315 may send a DMA request to the memory subsystem 320. As shown by reference number 730, the memory subsystem 320 may perform a DMA operation. As shown by reference number 735, based at least in part on the DMA operation being a write/copy operation, the memory subsystem 320 may read data from a source address. As shown by reference number 740, the memory subsystem 320 may buffer the data in one or more memory subsystem buffers near the memory. As shown by reference number 745, the memory subsystem 320 may write the buffered data to the memory. As shown by reference number 750, based at least in part on the DMA operation being a read operation, the memory subsystem 320 may read data from the memory. As shown by reference number 755, the memory subsystem 320 may buffer the data in the memory subsystem 320 near the SMMU 315. As shown by reference number 760, the SMMU 315 may send the data to the client device 305.

As shown in example 705 of FIG. 7B, a DMA engine (shown as DMA 765) may communicate with the SMMU 315 (e.g., the TC 330) using the ADI-H interface. Additionally, a RIM component of the SMMU 315 may communicate with the memory subsystem 320 over an ADI for execution (ADI-E). One or more WKRs 770 may be allocated for DMA (shown in dark gray shading).

As indicated above, FIGS. 7A-7B are provided as examples. Other examples may differ from what is described with regard to FIGS. 7A-7B.

Figure 8:
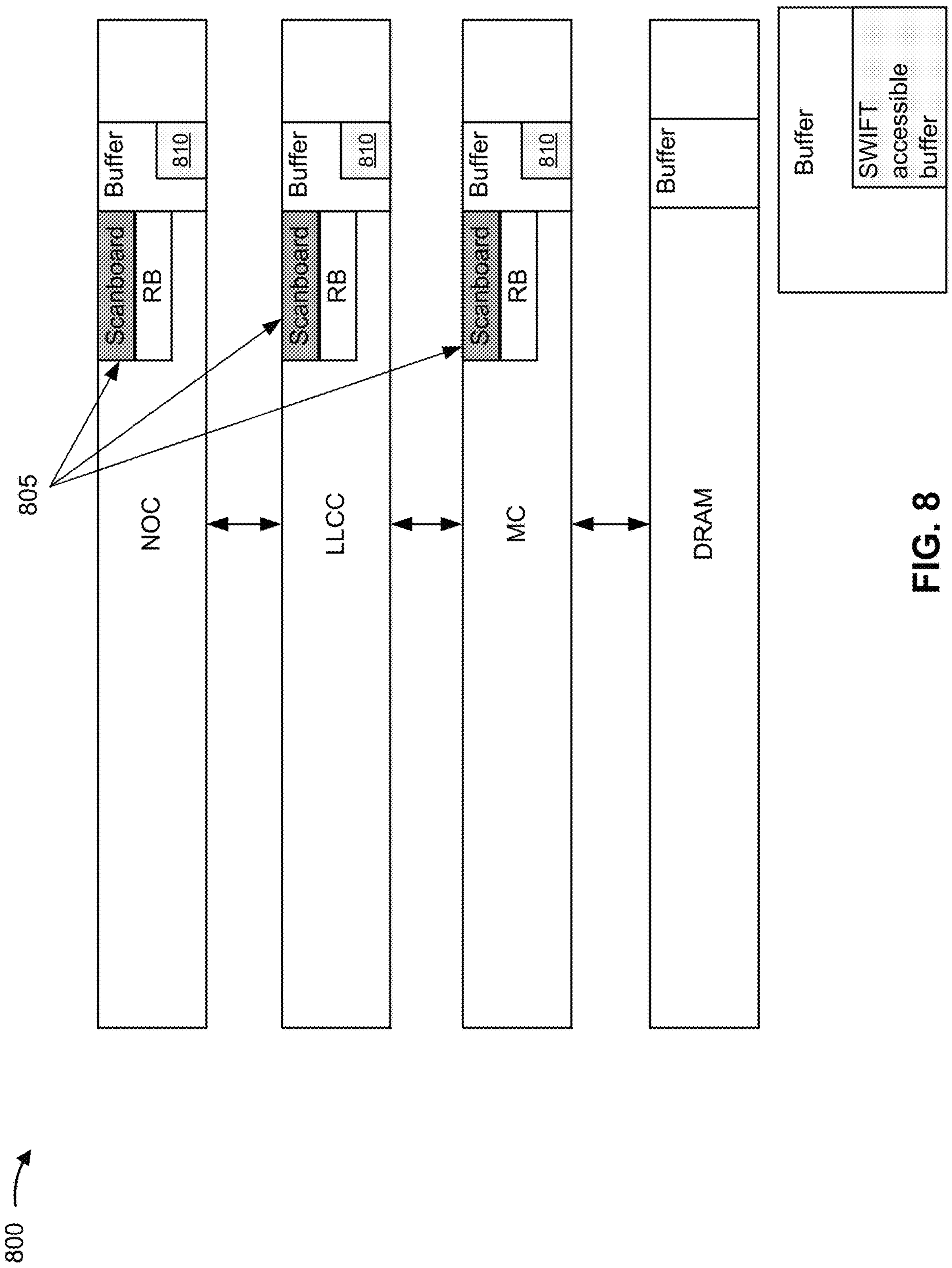
FIG. 8 is a diagram illustrating an example of memory subsystem buffers.

FIG. 8 is a diagram illustrating an example 800 of memory subsystem buffers. As described herein, one or more memory subsystem buffers may be used (e.g., repurposed) as DMA buffers. For example, a certain percentage of the total buffer capacity may be allocated for DMA data. In some aspects, a hardware component (such as a scanboard 805) may be used to monitor the buffer availability for DMA data storage. In some aspects, DMA operations may be performed using multi-walker allocation for faster memory access writes for multi-bank access. Additionally, or alternatively, the DMA operation may be performed by evicting the buffered (DMA) data entries in memory subsystem after a successful write operation, thereby reducing the load time associated with one or more buffers 810. In some aspects, the scanboard 805 may maintain a field (such as a reserved buffer (RB) field) that indicates the buffer availability for SWIFT. The RB field may indicate a percentage (or other measurement) of the buffers 810 that are available for SWIFT. In some aspects, buffer 810 can be implemented at any module in memory subsystem hierarchy, even inside DRAM. In some aspects, the memory subsystem 320 may perform one or more processing in-memory (PIM) operations. Allocating buffers in DRAM may reduce operation latency for copy operation as data is moved across local DRAM buffers. In a first example, the DMA operation can be performed within the DRAM with an additional buffer included in the DRAM. In a second example, the DMA operation can be performed within the DRAM with free DRAM cells that can be used as buffers for DMA operations. In the second example, the SoC and the DRAM may coordinate regarding the release of reserved DRAM cells. The existing data may be moved another part of the DRAM cell or to an external memory. In some aspects, the round-trip latency for copy or move operations may be reduced to the smaller data path.

As indicated above, FIG. 8 is provided as an example. Other examples may differ from what is described with regard to FIG. 8.

Figure 9:
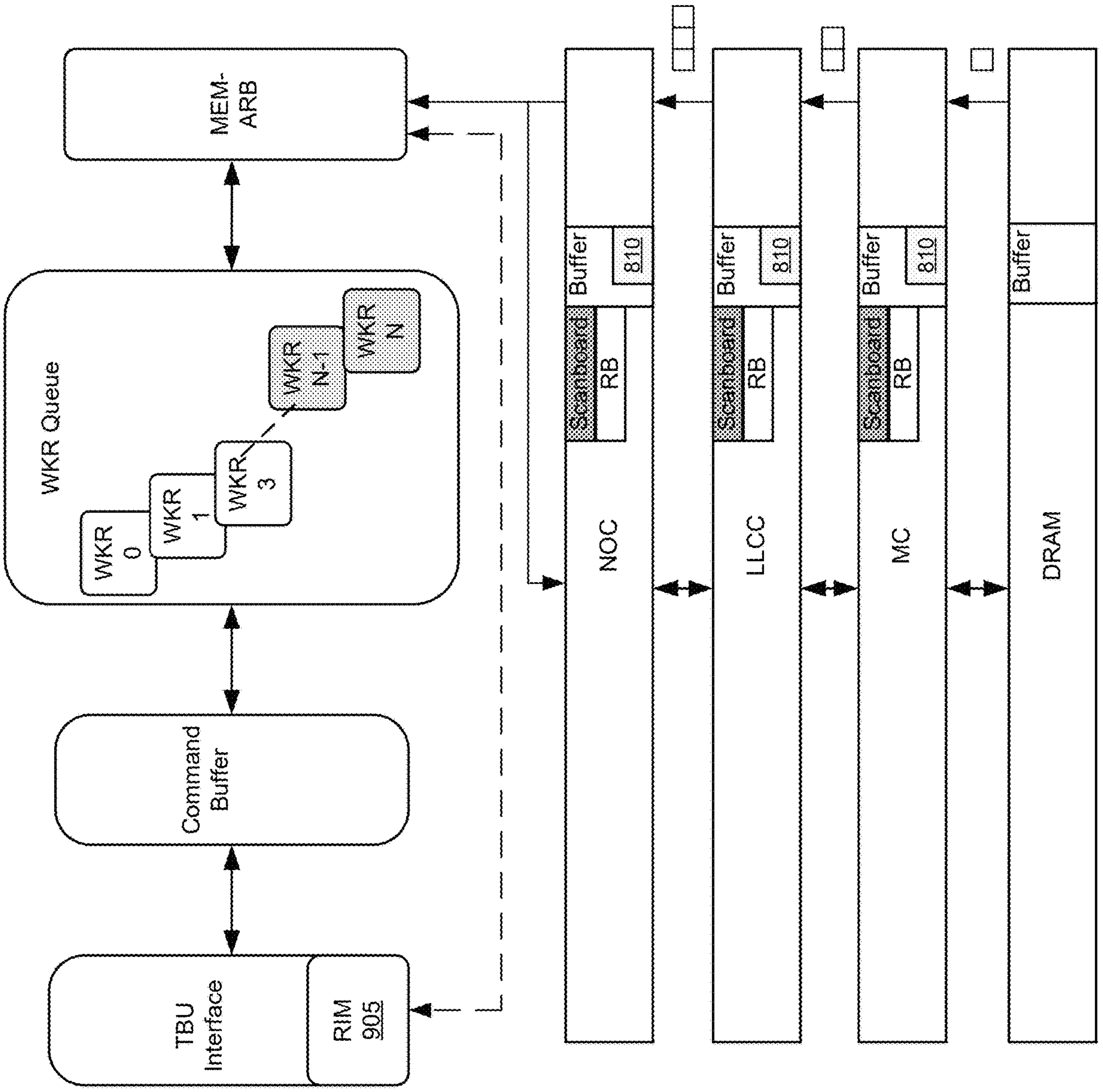
FIG. 9 is a diagram illustrating an example of hardware components as direct memory access controllers.

FIG. 9 is a diagram illustrating an example 900 of hardware components as direct memory access controllers. A resource and inspection management component (shown as RIM 905) may determine whether the SMMU 315 is able to process an incoming DMA request. The RIM 905 may scan the SMMU 315 (e.g., the TC 330 of the SMMU 315) for available walkers for DMA operations. Additionally, or alternatively, the RIM 905 may scan the memory subsystem 320 for buffer availability for SWIFT requests. The RIM 905 may send a response that indicates a reserved size of the available buffers for DMA operations. One or more idle WKRs may be reused as DMA controllers. For example, WKR 0, WKR 1, and WKR 2 may not be repurposed as DMA controllers, whereas WKR N−1 and WKR N may be repurposed as DMA controllers.

In some aspects, a RIM operation may begin with a RIM component (shown as RIM 1010) broadcasting a resource inspection message to one or more memory subsystems 320. The memory subsystem 320, based at least in part on receiving the resource inspection message, may evaluate the RB field. The RIM 1010 may receive (e.g., from the MEM ARB), a collection of the RBs from all components included in the SMMU 315 or the memory subsystem 320. If the quantity of RBs is greater than (or greater than or equal to) a DMA request length, the RIM 1010 may accept an incoming DMA operation. In some aspects, a DDR interface may be configured to use ADI commands. Reserved bits or commands in the DDR interface may be used as ADI commands. Therefore, the same DDR interface may be used to switch between ADI and DRAM commands. In some aspects, the SMMU 315 or the memory subsystem 320 may switch between a DDR mode and a SWIFT mode, for example, using one or more bits (or one or more registers) to indicate the change between DDR and SWIFT.

As indicated above, FIG. 9 is provided as an example. Other examples may differ from what is described with regard to FIG. 9.

Figure 10:
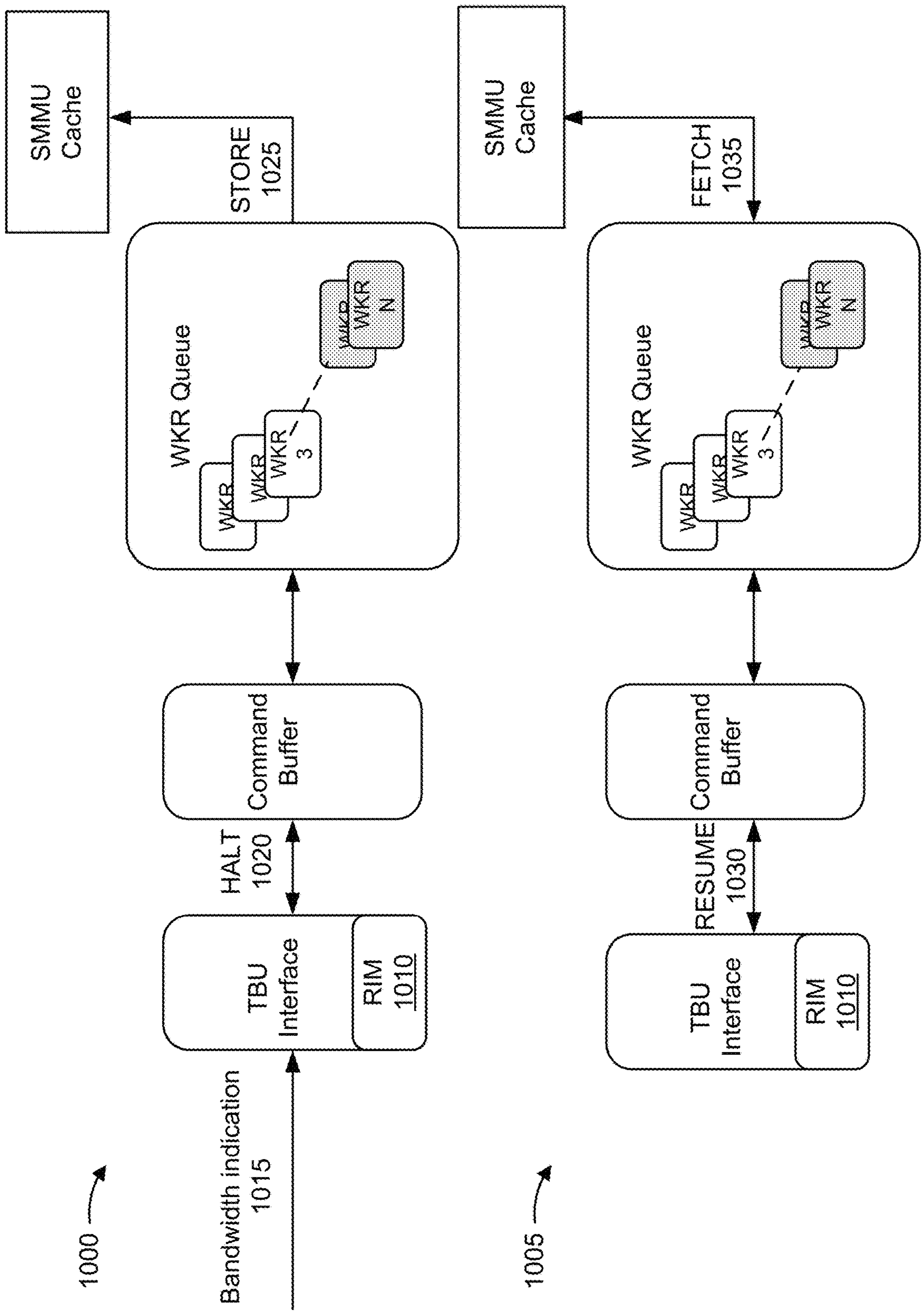
FIG. 10 is a diagram illustrating examples of halt and resume operations for resource inspection and management.

FIG. 10 is a diagram illustrating examples 1000 and 1005 of halt and resume operations for resource inspection and management. In some aspects, an active DMA operation may be halted (e.g., stopped or paused) when a standard memory request (e.g., an address translation request by the SMMU 315 or the TC 330) requires higher bandwidth. In some aspects, a TBU interface (e.g., the RIM 1010 included in the TBU interface) may receive a bandwidth indication 1015. The bandwidth indication may indicate that the SMMU 315 (or other memory device component) requires increased bandwidth. In some examples, the bandwidth indication may be propagated via a Req_Emergency (10) field or a sideband signal. The RIM 1010, based at least in part on receiving the bandwidth indication 1015, may cache the current state of operation, de-allocate one or more walkers associated with the DMA operation, and write a context of halted transactions in a register (e.g., an SMMU context register). As shown in example 1000, the RIM 1010 may send a halt indication (shown as HALT 1020) to the command buffer. A walker queue (shown as WKR Queue) may send a store indication (shown as STORE 1025) to store the context of stalled transactions.

In some aspects, one or more halted operations may be resumed based at least in part on the RIM 1010 communicating a resume operation. For example, the one or more halted operations may be resumed based at least in part on the translation buffer transmitting a 00 or a 01 in the Req_Emergency field or based at least in part on no incoming requests to the SMMU 315 or the SMMU context register being non-zero. In this example, the RIM 1010 may inspect the system for resource availability, allocate one or more walkers for the DMA operation, instruct the walker to fetch information (e.g., the source address (SA), destination address (DA), and address offset) from a cache, and decrement a counter stored at the SMMU context register. As shown in example 1005, the RIM 1010 may transmit a resume indication (shown as RESUME 1030) and the WKR Queue may fetch information (e.g., the SA, DA, and address offset) (shown as FETCH 1035) from the SMMU cache.

As indicated above, FIG. 10 is provided as an example. Other examples may differ from what is described with regard to FIG. 10.

Figure 11:
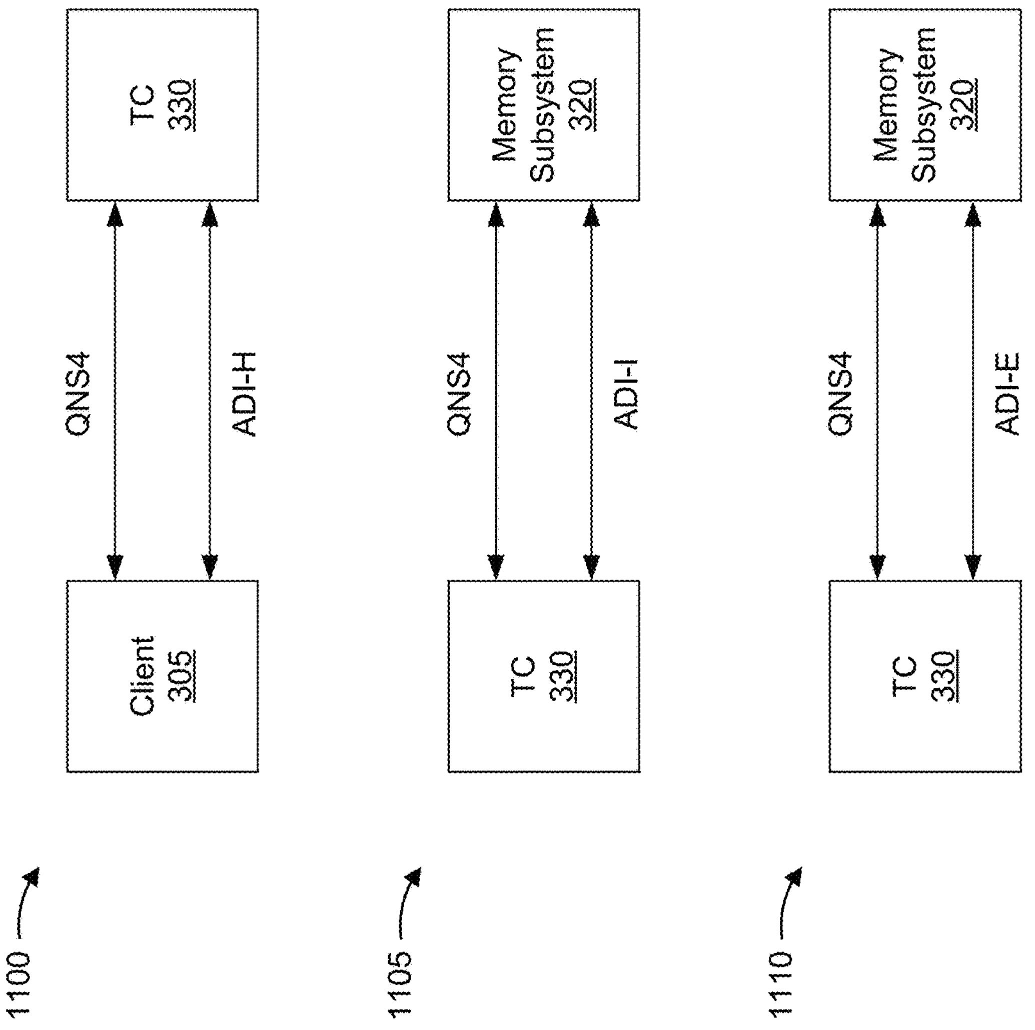
FIG. 11 is a diagram illustrating examples of interfaces for direct memory access operations.

FIG. 11 is a diagram illustrating examples 1100, 1105, and 1110 of interfaces for direct memory access operations.

As shown in example 1100, the client device 305 and the SMMU 315 may communicate via an AXI interface. Additionally, or alternatively, the client device 305 and the SMMU 315 may communicate via the ADI-H interface. The client device 305 and the SMMU 315 may communicate via the ADI-H interface for performing handshake operations. For example, using the ADI-H interface, a DMA engine may request for the SMMU 315 to process DMA transactions. DMA requests to the SMMU 315 may be via the TB 325 or via a dedicated input from the client device. In some aspects, a request associated with the ADI-H interface (e.g., a request from the client device 305 to the SMMU 315) may include a transaction ID (TID), an SA, a DA, a request type indicator (which may include one or more or a TC identifier, a DMA read indicator, or a DMA copy indicator), a request length indicator, and a request emergency indicator (e.g., priority unset (00), DMA priority (01), TC address translation (10), or reserved (11) (which may behave as (10)). In some aspects, a response associated with the ADI-H interface (e.g., a response from the SMMU 315 to the client device 305) may include a TID, a response type (e.g., handshake or execution), and an ACK (e.g., a positive ACK or a negative ACK).

As shown in example 1105, the SMMU 315 and the memory subsystem 320 may communicate via the AXI interface. Additionally, or alternatively, the SMMU 315 and the memory subsystem 320 may communicate via the ADI-I interface. The SMMU 315 and the memory subsystem 320 may communicate via the ADI-I interface for performing inspection operations. For example, using the ADI-I interface, the RIM component may inspect a memory subsystem buffer availability. In some aspects, a request associated with the ADI-I interface (e.g., a request from the SMMU 315 to the memory subsystem 320) may include a resource discovery unit (RDU) message type (e.g., a buffer discovery request). In some aspects, a response associated with the ADI-I interface (e.g., a response from the memory subsystem 320 to the SMMU 315) may include an NOC-RB indicator (indicating a reserved buffer at the NOC), an LLC-RB indicator (indicating a reserved buffer at the LLCC), and an MC-RB indicator (indicating a reserved buffer at the MC).

As shown in example 1110, the SMMU 315 and the memory subsystem 320 may communicate via the AXI interface. Additionally, or alternatively, the SMMU 315 and the memory subsystem 320 may communicate via the ADI-E interface. The SMMU 315 and the memory subsystem 320 may communicate via the ADI-E interface for performing execution operations. For example, using the ADI-E interface, a SWIFT engine may continuously monitor the DMA operation, such as by issuing contiguous read or write requests to the DRAM or by monitoring the DMA transactions and responding to the client device 305. In some aspects, a request associated with the ADI-E interface (e.g., a request from the SMMU 315 to the memory subsystem 320) may include an SA, a transaction ID (TxID), a sequence number (Seq ID), an RnW request indicator (where a value of "1" indicates a read request and a value of "0" indicates a write request), and a tag indicator (indicating tag information at the destination). In some aspects, a response associated with the ADI-E interface (e.g., a response from the memory subsystem 320 to the SMMU 315) may include a module ID (MID), a TxID, a sequence number, an RnW response indicator (where a value of "1" indicates a read request and a value of "0" indicates a write request), and a buffer tag indicator (indicating tag information of the buffer storing the data).

As indicated above, FIG. 11 is provided as an example. Other examples may differ from what is described with regard to FIG. 11.

Figure 12:
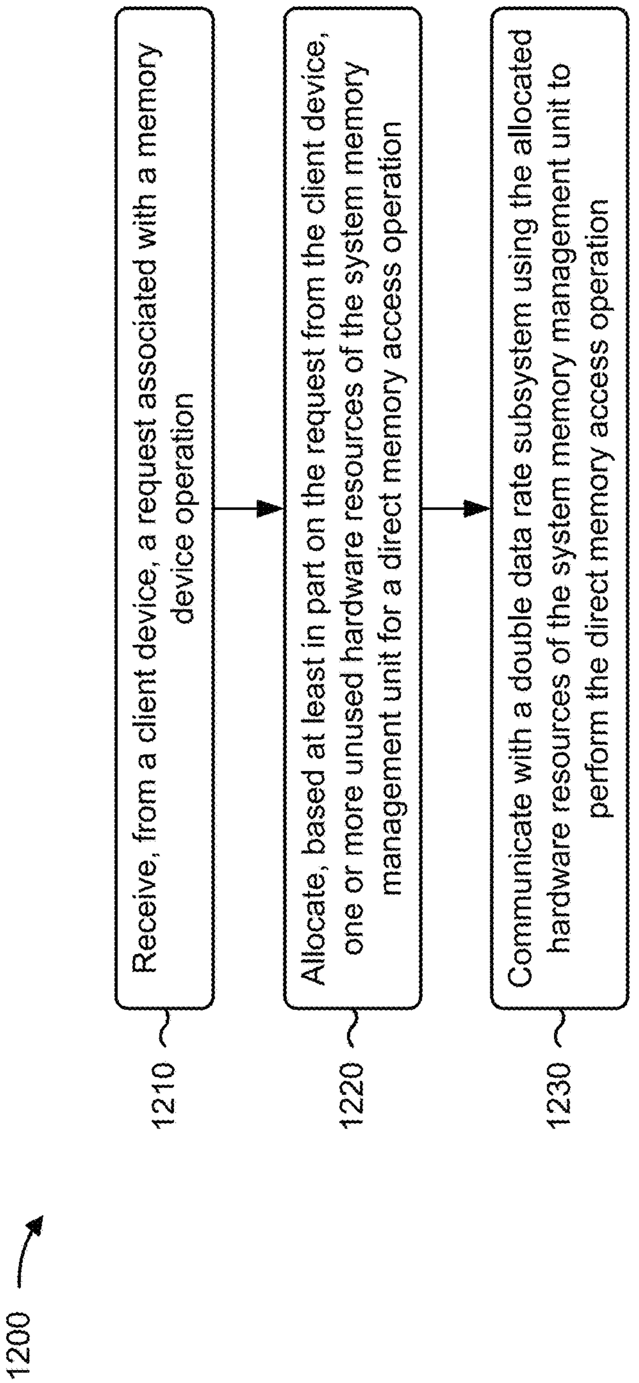
FIG. 12 is a flowchart of an example process associated with direct memory access operations.

FIG. 12 is a flowchart of an example process 1200 associated with direct memory access operations. One or more process blocks of FIG. 12 are performed by a system memory management unit (e.g., the SMMU 315) or by another device or a group of devices separate from or including the SMMU 315.

As shown in FIG. 12, process 1200 includes receiving, from a client device, a request associated with a memory device operation (block 1210). For example, the system memory management unit may receive, from a client device, a request associated with a memory device operation, as described above.

As further shown in FIG. 12, process 1200 includes allocating, based at least in part on the request from the client device, one or more unused hardware resources of the system memory management unit for a direct memory access operation (block 1220). For example, the system memory management unit may allocate, based at least in part on the request from the client device, one or more unused hardware resources of the system memory management unit for a direct memory access operation, as described above.

As further shown in FIG. 12, process 1200 includes communicating with a memory subsystem using the allocated hardware resources of the system memory management unit to perform the direct memory access operation (block 1230). For example, the system memory management unit may communicate with a memory subsystem using the allocated hardware resources of the system memory management unit to perform the direct memory access operation, as described above.

Process 1200 may include additional aspects, such as any single aspect or any combination of aspects described below or in connection with one or more other processes described elsewhere herein.

In a first aspect, the one or more unused hardware resources are associated with the system memory management unit.

In a second aspect, alone or in combination with the first aspect, process 1200 includes determining, by the system memory management unit based at least in part on the request from the client device being associated with the direct memory access operation, a quantity of available unused hardware resources of the system memory management unit.

In a third aspect, alone or in combination with one or more of the first and second aspects, process 1200 includes sending, to the client device, a negative acknowledgement message based at least in part on the quantity of available unused hardware resources failing to satisfy a quantity threshold.

In a fourth aspect, alone or in combination with one or more of the first through third aspects, process 1200 includes sending, to the memory subsystem, a buffer discovery request based at least in part on the quantity of available unused hardware resources satisfying a quantity threshold.

In a fifth aspect, alone or in combination with one or more of the first through fourth aspects, process 1200 includes receiving, from the memory subsystem, a response that indicates whether a buffer is available at the memory subsystem.

In a sixth aspect, alone or in combination with one or more of the first through fifth aspects, process 1200 includes sending, to the client device, a negative acknowledgement message based at least in part on the buffer not being available at the memory subsystem.

In a seventh aspect, alone or in combination with one or more of the first through sixth aspects, the one or more unused hardware resources are allocated based at least in part on the buffer being available at the memory subsystem.

In an eighth aspect, alone or in combination with one or more of the first through seventh aspects, process 1200 includes sending, to the client device, an indication that the one or more unused hardware resources have been allocated to the client device.

In a ninth aspect, alone or in combination with one or more of the first through eighth aspects, process 1200 includes translating an address associated with the request from the client device based at least in part on the address being a virtual address, wherein the address is at least one of a source address or a destination address.

In a tenth aspect, alone or in combination with one or more of the first through ninth aspects, process 1200 includes initiating the direct memory access operation based at least in part on an address indicated in the request from the client device.

In an eleventh aspect, alone or in combination with one or more of the first through tenth aspects, process 1200 includes receiving a direct memory access response from the memory subsystem, wherein the direct memory access response is based at least in part on the direct memory access operation, and sending the direct memory access response to the client device.

In a twelfth aspect, alone or in combination with one or more of the first through eleventh aspects, allocating the one or more unused hardware resources of the system memory management unit for the direct memory access operation comprises repurposing one or more page translation walkers as direct memory access engines for performing the direct memory access operation.

In a thirteenth aspect, alone or in combination with one or more of the first through twelfth aspects, the system memory management unit is configured to communicate with the client device using a handshake interface, wherein the system memory management unit is configured to communicate with the memory subsystem using an inspection interface for identifying one or more available buffers, and wherein the system memory management unit is configured to communicate with the memory subsystem are using an execution interface for performing the direct memory access operation.

In a fourteenth aspect, alone or in combination with one or more of the first through thirteenth aspects, process 1200 includes halting the direct memory access operation based at least in part on a bandwidth associated with one or more other memory operations of the system memory management unit being greater than or equal to a threshold.

In a fifteenth aspect, alone or in combination with one or more of the first through fourteenth aspects, process 1200 includes resuming the direct memory access operation based at least in part on receiving an emergency signal or based at least in part on a quantity of incoming requests to the system memory management unit or a context register of the system memory management unit being greater than or equal to one.

Although FIG. 12 shows example blocks of process 1200, in some aspects, process 1200 includes additional blocks, fewer blocks, different blocks, or differently arranged blocks than those depicted in FIG. 12. Additionally, or alternatively, two or more of the blocks of process 1200 may be performed in parallel.

Figure 13:
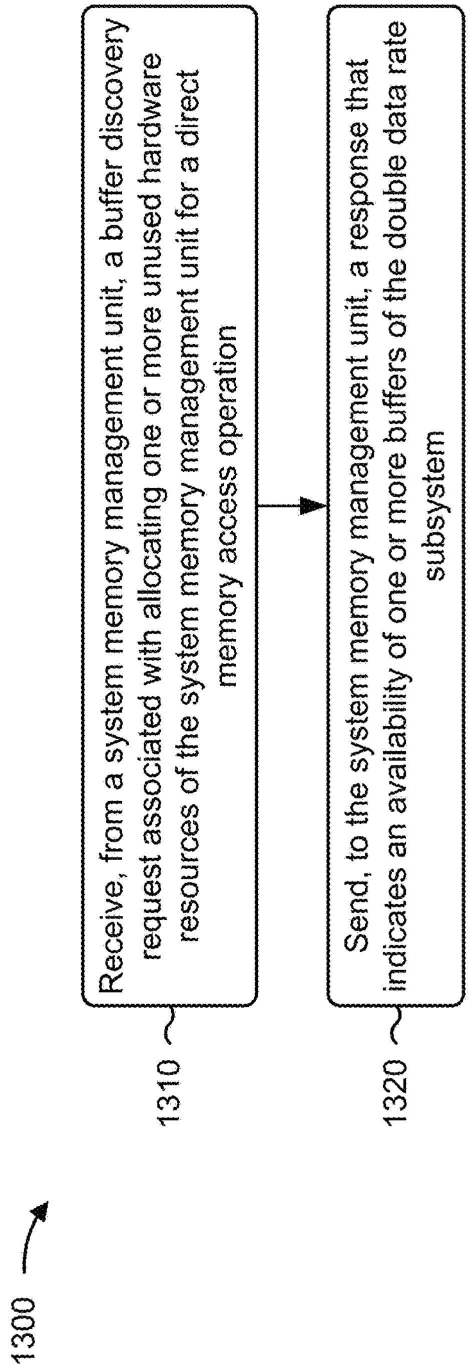
FIG. 13 is a flowchart of an example process associated with direct memory access operations.

FIG. 13 is a flowchart of an example process 1300 associated with direct memory access operations. One or more process blocks of FIG. 13 are performed by a memory subsystem (e.g., memory subsystem 320) or by another device or a group of devices separate from or including the memory subsystem.

As shown in FIG. 13, process 1300 includes receiving, from a system memory management unit, a buffer discovery request associated with allocating one or more unused hardware resources of the system memory management unit for a direct memory access operation (block 1310). For example, the memory subsystem may receive, from a system memory management unit, a buffer discovery request associated with allocating one or more unused hardware resources of the system memory management unit for a direct memory access operation, as described above.

As further shown in FIG. 13, process 1300 includes sending, to the system memory management unit, a response that indicates an availability of one or more buffers of the memory subsystem (block 1320). For example, the memory subsystem may send, to the system memory management unit, a response that indicates an availability of one or more buffers of the memory subsystem, as described above.

Process 1300 may include additional aspects, such as any single aspect or any combination of aspects described below or in connection with one or more other processes described elsewhere herein.

In a first aspect, receiving the buffer discovery request comprises receiving the buffer discovery request from a translation controller of the system memory management unit, and sending the response comprises sending the response to the translation controller of the system memory management unit.

In a second aspect, alone or in combination with the first aspect, process 1300 includes receiving, from the system memory management unit, a request to perform the direct memory access operation, and performing the direct memory access operation in accordance with the request to perform the direct memory access operation.

In a third aspect, alone or in combination with one or more of the first and second aspects, the direct memory access operation is a write operation or a copy operation, and performing the direct memory access operation comprises reading data associated with a source address indicated in the direct memory access operation, storing the data in a buffer that is within a threshold distance of a memory of the memory subsystem, and writing the data to the memory of the memory subsystem.

In a fourth aspect, alone or in combination with one or more of the first through third aspects, the direct memory access operation is a read operation, and performing the direct memory access operation comprises reading data from a memory of the memory subsystem, and storing the data in a buffer that is within a threshold distance of the system memory management unit.

In a fifth aspect, alone or in combination with one or more of the first through fourth aspects, the one or more buffers include one or more system buffers for storing data close to a memory of the memory subsystem and one or more system buffers comprising one or more dynamic random access memory cells.

Although FIG. 13 shows example blocks of process 1300, in some aspects, process 1300 includes additional blocks, fewer blocks, different blocks, or differently arranged blocks than those depicted in FIG. 13. Additionally, or alternatively, two or more of the blocks of process 1300 may be performed in parallel.

Figure 14:
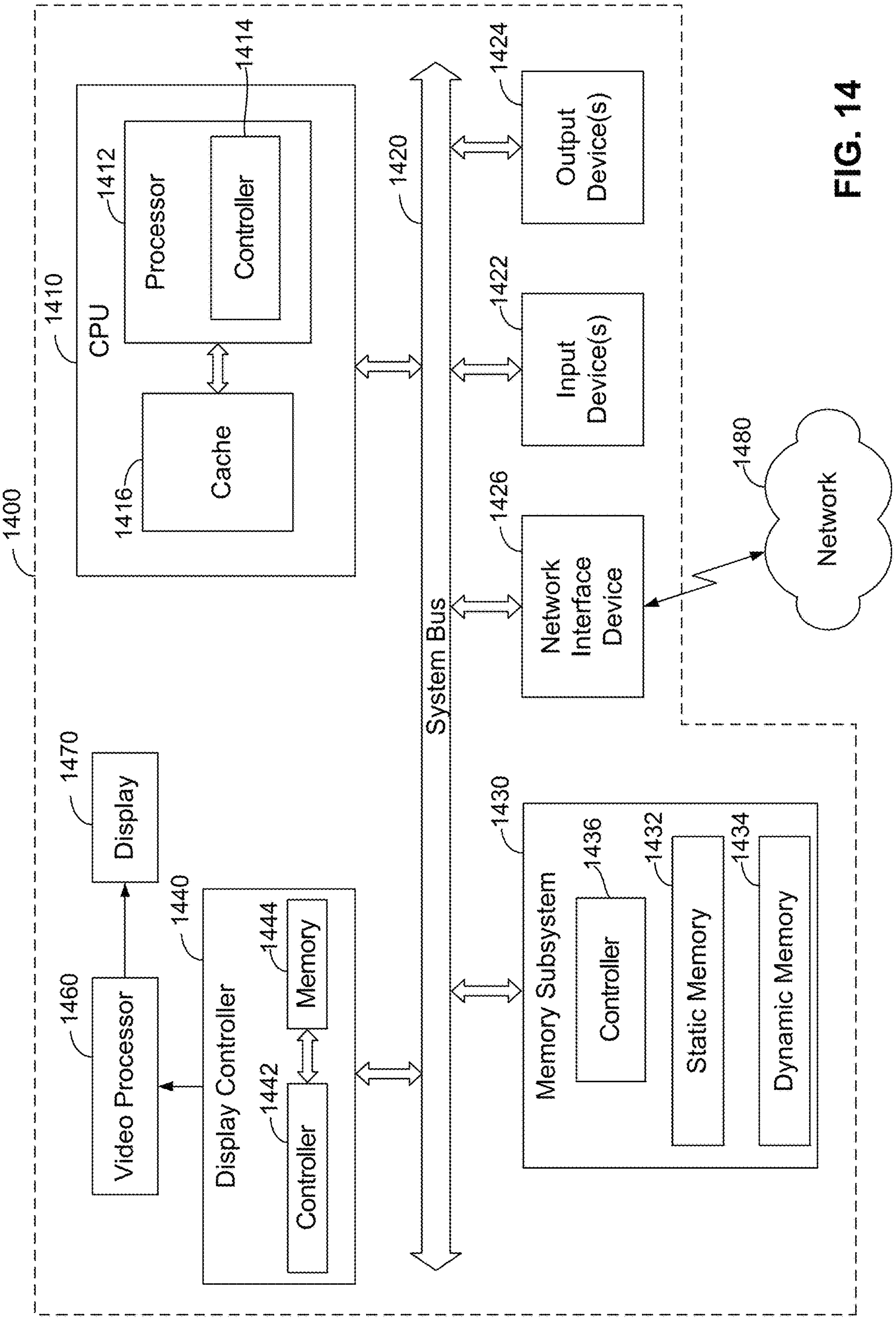
FIG. 14 is a diagram illustrating an example system that may support direct memory access operations.

FIG. 14 is a diagram illustrating an example system 1400 that may support direct memory access operations. More particularly, as described herein, the direct memory access operation mechanisms and the corresponding methods or processes described herein can be employed in any circuit, including but not limited to a microprocessor-based circuit, system, or others suitable electronic device. For example, electronic devices that can include or otherwise employ the direct memory access operation mechanisms described herein can include, without limitation, mobile phones, cellular phones, computers, portable computers, desktop computers, personal digital assistants (PDAs), monitors, computer monitors, televisions, tuners, radios, satellite radios, digital music players, portable music players, digital video players, digital video disc (DVD) players, or portable digital video players, among other examples.

For example, in some aspects, FIG. 14 illustrates an example system 1400 that can employ the direct memory access operation mechanisms and corresponding methods or processes described in further detail herein. For example, as shown in FIG. 14, the system 1400 may include a CPU 1410 that includes a cache 1416 and a processor 1412, which may include a controller 1414 configured to perform one or more operations described herein in connection with FIGS. 3-11. Furthermore, although FIG. 14 illustrates that the controller 1414 is included in the processor 1412, the controller 1414 may reside at any suitable location within the system 1400, such as within an integrated circuit that is controlled using command bus training techniques or on an external integrated circuit. Additionally, or alternatively, the controller 1414 may be configured to perform one or more processes described herein, such as process 1200 of FIG. 12 or process 1300 of FIG. 13. Additionally, or alternatively, one or more components shown in FIG. 14 may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

In some aspects, the CPU 1410 may be coupled to a system bus 1420, which may intercouple various other devices or components included in the system 1400. The CPU 1410 may exchange address, control, and data information over the system bus 1420 to communicate with the other devices or components included in the system 1400. For example, as illustrated in FIG. 14, the devices or components included in the system 1400 can include a memory subsystem 1430 that can include static memory 1432 or dynamic memory 1434, one or more input devices 1422, one or more output devices 1424, a network interface device 1426, and a display controller 1440. The memory subsystem 1430 may include a controller 1436. The controller 1436 may be configured to perform one or more operations (e.g., for commands transmitted via the system bus 1420), such as the direct memory access operations described herein. The controller 1436 may be configured to perform one or more operations described herein in connection with FIGS. 3-13. Furthermore, although FIG. 14 illustrates that the controller 1436 is included in the memory subsystem 1430, the controller 1436 may reside at any suitable location within the system 1400, such as within an integrated circuit that is controlled using command bus training techniques or on an external integrated circuit.

In various embodiments, the input devices 1422 can include any suitable input device type, such as input keys, switches, voice processors, or the like. The output devices 1424 can similarly include any suitable output device type, such as audio, video, other visual indicators, or the like. The network interface device 1426 can be any device configured to allow exchange of data to and from a network 1480, which may include any suitable network type, including but not limited to a wired or wireless network, private or public network, a local area network (LAN), a wide local area network (WLAN), and the Internet. The network interface device 1426 can support any type of communication protocol desired. The CPU 1410 can access the memory subsystem 1430 over the system bus 1420.

In some aspects, the CPU 1410 can access the display controller 1440 over the system bus 1420 to control information sent to a display 1470. The display controller 1440 can include a memory controller 1442 and memory 1444 to store data to be sent to the display 1470 in response to communications with the CPU 1410. The display controller 1440 sends information to the display 1470 to be displayed via a video processor 1460, which processes the information to be displayed into a format suitable for the display 1470. The display 1470 can include any suitable display type, including but not limited to a cathode ray tube (CRT), a liquid crystal display (LCD), a plasma display, or the like.

As indicated above, FIG. 14 is provided as an example. Other examples may differ from what is described with respect to FIG. 14.

The following provides an overview of some Aspects of the present disclosure:

Aspect 1: A method performed by a system memory management unit, comprising: receiving, from a client device, a request associated with a memory device operation; allocating, based at least in part on the request from the client device, one or more unused hardware resources of the system memory management unit for a direct memory access operation; and communicating with a memory subsystem using the allocated hardware resources of the system memory management unit to perform the direct memory access operation.

Aspect 2: The method of Aspect 1, wherein the one or more unused hardware resources are associated with a translation controller of the system memory management unit.

Aspect 3: The method of any of Aspects 1-2, further comprising determining, by the system memory management unit based at least in part on the request from the client device being associated with the direct memory access operation, a quantity of available unused hardware resources of the system memory management unit.

Aspect 4: The method of Aspect 3, further comprising sending, to the client device, a negative acknowledgement message based at least in part on the quantity of available unused hardware resources failing to satisfy a quantity threshold.

Aspect 5: The method of Aspect 3, further comprising sending, to the memory subsystem, a buffer discovery request based at least in part on the quantity of available unused hardware resources satisfying a quantity threshold.

Aspect 6: The method of Aspect 5, further comprising receiving, from the memory subsystem, a response that indicates whether a buffer is available at the memory subsystem.

Aspect 7: The method of Aspect 6, further comprising sending, to the client device, a negative acknowledgement message based at least in part on the buffer not being available at the memory subsystem.

Aspect 8: The method of Aspect 6, wherein the one or more unused hardware resources are allocated based at least in part on the buffer being available at the memory subsystem.

Aspect 9: The method of Aspect 8, further comprising sending, to the client device, an indication that the one or more unused hardware resources have been allocated to the client device.

Aspect 10: The method of any of Aspects 1-9, further comprising translating an address associated with the request from the client device based at least in part on the address being a virtual address, wherein the address is at least one of a source address or a destination address.

Aspect 11: The method of any of Aspects 1-10, further comprising initiating the direct memory access operation based at least in part on an address indicated in the request from the client device.

Aspect 12: The method of Aspect 11, further comprising: receiving a direct memory access response from the memory subsystem, wherein the direct memory access response is based at least in part on the direct memory access operation; and sending the direct memory access response to the client device.

Aspect 13: The method of any of Aspects 1-12, wherein allocating the one or more unused hardware resources of the system memory management unit for the direct memory access operation comprises repurposing one or more page translation walkers as direct memory access engines for performing the direct memory access operation.

Aspect 14: The method of any of Aspects 1-13, wherein the system memory management unit is configured to communicate with the client device using a handshake interface, wherein the system memory management unit is configured to communicate with the memory subsystem using an inspection interface for identifying one or more available buffers, and wherein the system memory management unit is configured to communicate with the memory subsystem are using an execution interface for performing the direct memory access operation.

Aspect 15: The method of any of Aspects 1-14, further comprising halting the direct memory access operation based at least in part on a bandwidth associated with one or more other memory operations of the system memory management unit being greater than or equal to a threshold.

Aspect 16: The method of Aspect 15, further comprising resuming the direct memory access operation based at least in part on receiving an emergency signal or based at least in part on a quantity of incoming requests to the system memory management unit or a context register of the system memory management unit being greater than or equal to one.

Aspect 17: A method performed by a memory subsystem, comprising: receiving, from a system memory management unit, a buffer discovery request associated with allocating one or more unused hardware resources of the system memory management unit for a direct memory access operation; and sending, to the system memory management unit, a response that indicates an availability of one or more buffers of the memory subsystem.

Aspect 18: The method of Aspect 17, wherein receiving the buffer discovery request comprises receiving the buffer discovery request from a translation controller of the system memory management unit, and wherein sending the response comprises sending the response to the translation controller of the system memory management unit.

Aspect 19: The method of any of Aspects 17-18, further comprising: receiving, from the system memory management unit, a request to perform the direct memory access operation; and performing the direct memory access operation in accordance with the request to perform the direct memory access operation.

Aspect 20: The method of any of Aspects 17-19, wherein the direct memory access operation is a write operation or a copy operation, and wherein performing the direct memory access operation comprises: reading data associated with a source address indicated in the direct memory access operation; storing the data in a buffer that is within a threshold distance of a memory of the memory subsystem; and writing the data to the memory of the memory subsystem.

Aspect 21: The method of any of Aspects 17-20, wherein the direct memory access operation is a read operation, and wherein performing the direct memory access operation comprises: reading data from a memory of the memory subsystem; and storing the data in a buffer that is within a threshold distance of the system memory management unit.

Aspect 22: The method of any of Aspects 17-21, wherein the one or more buffers include one or more system buffers for storing data close to a memory of the memory subsystem and one or more system buffers comprising one or more dynamic random access memory cells.

Aspect 23: A system comprising: a client device, wherein the client device is configured to: send, to a system memory management unit, a request associated with a memory device operation; the system memory management unit, wherein the system memory management unit is configured to: receive, from the client device, the request associated with the memory device operation; allocate, based at least in part on the request from the client device, one or more unused hardware resources of the system memory management unit for a direct memory access operation; and communicate with a memory subsystem using the allocated hardware resources of the system memory management unit to perform the direct memory access operation; and the memory subsystem, wherein the memory subsystem is configured to: receive, from the system memory management unit, a buffer discovery request associated with allocating the one or more unused hardware resources of the system memory management unit for the direct memory access operation; and send, to the system memory management unit, a response that indicates an availability of one or more buffers of the memory subsystem.

Aspect 24: The system of Aspect 23, wherein the one or more unused hardware resources are associated with a translation controller of the system memory management unit.

Aspect 25: The system of any of Aspects 23-24, wherein the system memory management unit is further configured to determine, based at least in part on the request from the client device being associated with the direct memory access operation, a quantity of available unused hardware resources of the system memory management unit.

Aspect 26: The system of Aspect 25, wherein the system memory management unit is further configured to send, to the client device, a negative acknowledgement message based at least in part on the quantity of available unused hardware resources failing to satisfy a quantity threshold.

Aspect 27: The system of Aspect 25, wherein the system memory management unit is further configured to send, to the memory subsystem, a buffer discovery request based at least in part on the quantity of available unused hardware resources satisfying a quantity threshold.

Aspect 28: The system of Aspect 27, wherein the system memory management unit is further configured to receive, from the memory subsystem, a response that indicates whether a buffer is available at the memory subsystem.

Aspect 29: The system of Aspect 28, wherein the system memory management unit is further configured to send, to the client device, a negative acknowledgement message based at least in part on the buffer not being available at the memory subsystem.

Aspect 30: The system of Aspect 28, wherein the one or more unused hardware resources are allocated based at least in part on the buffer being available at the memory subsystem.

Aspect 31: The system of Aspect 28, wherein the system memory management unit is further configured to send, to the client device, an indication that the one or more unused hardware resources have been allocated to the client device.

Aspect 32: The system of any of Aspects 23-31, wherein the system memory management unit is further configured to translate an address associated with the request from the client device based at least in part on the address being a virtual address, wherein the address is at least one of a source address or a destination address.

Aspect 33: The system of any of Aspects 23-32, wherein the system memory management unit is further configured to initiate the direct memory access operation based at least in part on an address indicated in the request from the client device.

Aspect 34: The system of Aspect 33, wherein the system memory management unit is further configured to: receive a direct memory access response from the memory subsystem, wherein the direct memory access response is based at least in part on the direct memory access operation; and send the direct memory access response to the client device.

Aspect 35: The system of Aspect 34, wherein the memory subsystem is further configured to: receive, from the system memory management unit, a request to perform the direct memory access operation; and perform the direct memory access operation in accordance with the request to perform the direct memory access operation.

Aspect 36: The system of Aspect 35, wherein the direct memory access operation is a write operation or a copy operation, and wherein the memory subsystem, to perform the direct memory access operation, is configured to: read data associated with a source address indicated in the direct memory access operation; store the data in a buffer that is within a threshold distance of a memory of the memory subsystem; and write the data to the memory of the memory subsystem.

Aspect 37: The system of Aspect 35, wherein the direct memory access operation is a read operation, and wherein the memory subsystem, to perform the direct memory access operation, is configured to: read data from a memory of the memory subsystem; and store the data in a buffer that is within a threshold distance of the system memory management unit.

Aspect 38: A system configured to perform one or more operations recited in one or more of Aspects 1-37.

Aspect 39: An apparatus comprising means for performing one or more operations recited in one or more of Aspects 1-37.

Aspect 40: A non-transitory computer-readable medium storing a set of instructions, the set of instructions comprising one or more instructions that, when executed by a device, cause the device to perform one or more operations recited in one or more of Aspects 1-37.

Aspect 41: A computer program product comprising instructions or code for executing one or more operations recited in one or more of Aspects 1-37.

It will be apparent that systems or methods described herein may be implemented in different forms of hardware or a combination of hardware and software. A component being configured to perform a function means that the component has a capability to perform the function, and does not require the function to be actually performed by the component, unless noted otherwise.

As used herein, the term "determine" or "determining" can encompass one or more of a wide variety of actions. For example, "determining" can include one or more of calculating, computing, processing, deriving, detecting, estimating, investigating, looking up, inferring, ascertaining, measuring, resolving, selecting, choosing, obtaining, identifying, interpreting, demodulating, decoding, reading, establishing, forming or generating, among other examples. In some such examples, determining can involve a processor performing some type of calculating, computing, deriving, estimating, inferring, ascertaining, resolving, predicting or other processing to obtain one or more numerical values, sets, elements or other information or results. In some other such examples, determining can involve a processor identifying, looking up, investigating or otherwise obtaining some type of value, set, element or other information or result from a table, a data structure, a database or other memory device or location. In some other such examples, determining can involve a processor identifying, interpreting, demodulating, decoding, detecting, reading or otherwise obtaining some type of value, set, element or other information or result signaled in, for example, a received wireless packet. In some other such examples, determining can involve a processor selecting or choosing one or more values, sets, elements or other information or results from a larger set of values, sets elements or other information or results. In some other such examples, determining can involve a processor performing a measurement, such as on a received signal.

As used herein, the articles "a" and "an" are intended to refer to one or more items and may be used interchangeably with "one or more" or "at least one." As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. Additionally, as used herein, a phrase referring to "a" or "an" element refers to one or more of such elements acting individually or collectively to perform the recited function (s). Additionally, as used herein, a "set" can refer to one or more items, and a "subset" can refer to a whole set or less than the whole set, but not an empty set. "Set," "group," and similar terms are intended to include one or more items and may be used interchangeably with "one or more." Furthermore, as used herein, the term "or" is intended to be interpreted in the inclusive sense (such as when referring to a series) and may be used interchangeably with "and/or," unless otherwise explicitly indicated (for example, if used in conjunction with "either" or "only one of"). For example, "A or B" may include A only, B only, or a combination of A and B. Also, as used herein, the terms "has," "have," "having," "comprise," "comprising," "include" and "including," and derivatives thereof or similar terms are intended to be open-ended terms that do not limit an element that they modify (for example, an element "having" A also may have B).

As used herein, the phrase "associated with" is intended to be interpreted in the inclusive sense, unless otherwise explicitly indicated. For example, the phrase "associated with" is not to be construed as a reference to a closed set of conditions, factors, criteria, elements, components, or actions, among other examples. Specifically, unless a phrase refers to "associated with only 'a,'" or the equivalent in context, whatever it is that is "associated with 'a,'" may be associated with "a" alone or associated with a combination of "a" and one or more other conditions, factors, criteria, elements, components, or actions, among other examples. In various examples, the phrase "associated with" may be interpreted to mean "in association with," "in accordance with," "based on," "based at least in part on," "as a function of," "in response to," "responsive to," or "using" as appropriate in the relevant context unless otherwise explicitly indicated. Furthermore, what follows the phrase "associated with," "in association with," "in accordance with," "based on," "based at least in part on," "as a function of," "in response to," "responsive to," or "using" is not necessarily the focal point or primary factor associated with the limitation preceding the phrase.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the scope of all aspects described herein. Many of these features may be combined in ways not specifically recited in the claims or disclosed in the specification. The disclosure of various aspects includes each dependent claim in combination with every other claim in the claim set.

What is claimed is:

1. A system memory management unit, comprising:

one or more memories; and one or more processors, coupled to the one or more memories, configured to:

receive, from a client device, a request associated with a memory device operation;

allocate, based at least in part on the request from the client device, one or more unused hardware resources of the system memory management unit for a direct memory access operation; and communicate with a memory subsystem using the allocated hardware resources of the system memory management unit to perform the direct memory access operation.

2. The system memory management unit of claim 1, wherein the one or more unused hardware resources are associated with a translation controller of the system memory management unit.

3. The system memory management unit of claim 1, wherein the one or more processors are further configured to determine, based at least in part on the request from the client device being associated with the direct memory access operation, a quantity of available unused hardware resources of the system memory management unit.

4. The system memory management unit of claim 3, wherein the one or more processors are further configured to send, to the client device, a negative acknowledgement message based at least in part on the quantity of available unused hardware resources failing to satisfy a quantity threshold.

5. The system memory management unit of claim 3, wherein the one or more processors are further configured to send, to the memory subsystem, a buffer discovery request based at least in part on the quantity of available unused hardware resources satisfying a quantity threshold.

6. The system memory management unit of claim 5, wherein the one or more processors are further configured to receive, from the memory subsystem, a response that indicates whether a buffer is available at the memory subsystem.

7. The system memory management unit of claim 6, wherein the one or more processors are further configured to send, to the client device, a negative acknowledgement message based at least in part on the buffer not being available at the memory subsystem.

8. The system memory management unit of claim 6, wherein the one or more unused hardware resources are allocated based at least in part on the buffer being available at the memory subsystem.

9. The system memory management unit of claim 8, wherein the one or more processors are further configured to send, to the client device, an indication that the one or more unused hardware resources have been allocated to the client device.

10. The system memory management unit of claim 1, wherein the one or more processors are further configured to translate an address associated with the request from the client device based at least in part on the address being a virtual address, wherein the address is at least one of a source address or a destination address.

11. The system memory management unit of claim 1, wherein the one or more processors are further configured to initiate the direct memory access operation based at least in part on an address indicated in the request from the client device.

12. The system memory management unit of claim 11, wherein the one or more processors are further configured to:

receive a direct memory access response from the memory subsystem, wherein the direct memory access response is based at least in part on the direct memory access operation; and send the direct memory access response to the client device.

13. The system memory management unit of claim 1, wherein the one or more processors, to allocate the one or more unused hardware resources of the system memory management unit for the direct memory access operation, are configured to repurpose one or more page translation walkers as direct memory access engines for performing the direct memory access operation.

14. The system memory management unit of claim 1, wherein the system memory management unit is configured to communicate with the client device using a handshake interface, wherein the system memory management unit is configured to communicate with the memory subsystem using an inspection interface for identifying one or more available buffers, and wherein the system memory management unit is configured to communicate with the memory subsystem are using an execution interface for performing the direct memory access operation.

15. The system memory management unit of claim 1, wherein the one or more processors are further configured to halt the direct memory access operation based at least in part on a bandwidth associated with one or more other memory operations of the system memory management unit being greater than or equal to a threshold.

16. The system memory management unit of claim 15, wherein the one or more processors are further configured to resume the direct memory access operation based at least in part on receiving an emergency signal or based at least in part on a quantity of incoming requests to the system memory management unit or a context register of the system memory management unit being greater than or equal to one.

17. A memory subsystem, comprising:

one or more memories; and one or more processors, coupled to the one or more memories, configured to:

receive, from a system memory management unit, a buffer discovery request associated with allocating one or more unused hardware resources of the system memory management unit for a direct memory access operation; and send, to the system memory management unit, a response that indicates an availability of one or more buffers of the memory subsystem.

18. The memory subsystem of claim 17, wherein receiving the buffer discovery request comprises receiving the buffer discovery request from a translation controller of the system memory management unit, and wherein sending the response comprises sending the response to the translation controller of the system memory management unit.

19. The memory subsystem of claim 17, wherein the one or more processors are further configured to:

receive, from the system memory management unit, a request to perform the direct memory access operation; and perform the direct memory access operation in accordance with the request to perform the direct memory access operation.

20. A system comprising:

a client device, wherein the client device is configured to:

send, to a system memory management unit, a request associated with a memory device operation;

the system memory management unit, wherein the system memory management unit is configured to:

receive, from the client device, the request associated with the memory device operation;

allocate, based at least in part on the request from the client device, one or more unused hardware resources of the system memory management unit for a direct memory access operation; and communicate with a memory subsystem using the allocated hardware resources of the system memory management unit to perform the direct memory access operation; and the memory subsystem, wherein the memory subsystem is configured to:

receive, from the system memory management unit, a buffer discovery request associated with allocating the one or more unused hardware resources of the system memory management unit for the direct memory access operation; and send, to the system memory management unit, a response that indicates an availability of one or more buffers of the memory subsystem.

* * * * *